(12) United States Patent
Abergel et al.

(10) Patent No.: US 11,780,247 B2
(45) Date of Patent: *Oct. 10, 2023

(54) DEVICE AND METHOD FOR TRANSPORTING SUBSTRATES IN A PRINTING MACHINE

(71) Applicant: MGI Digital Technology, Fresnes (FR)

(72) Inventors: Edmond Abergel, Paris (FR); Louis Gautier Le Boulch, Meudon (FR)

(73) Assignee: MGI Digital Technology, Fresnes (FR)

( * ) Notice: Subject to any disclaimer, the term of this patent is extended or adjusted under 35 U.S.C. 154(b) by 92 days.

This patent is subject to a terminal disclaimer.

(21) Appl. No.: 17/190,309

(22) Filed: Mar. 2, 2021

(65) Prior Publication Data

US 2021/0197588 A1    Jul. 1, 2021

Related U.S. Application Data

(63) Continuation of application No. 16/304,688, filed as application No. PCT/EP2017/062714 on May 25, 2017, now Pat. No. 10,960,689.

(30) Foreign Application Priority Data

May 27, 2016    (EP) .................... 16305614

(51) Int. Cl.
| | |
|---|---|
| *B41J 11/06* | (2006.01) |
| *B41J 11/00* | (2006.01) |
| *B65G 54/02* | (2006.01) |
| *B65H 5/04* | (2006.01) |

(52) U.S. Cl.
CPC .............. *B41J 11/06* (2013.01); *B41J 11/007* (2013.01); *B41J 11/0085* (2013.01); *B65G 54/02* (2013.01); *B65H 5/04* (2013.01); *B65H 2405/352* (2013.01); *B65H 2405/3521* (2013.01); *B65H 2801/15* (2013.01)

(58) Field of Classification Search
CPC ....... B41J 11/06; B41J 11/007; B41J 11/0085; B65G 54/02; B65H 5/04; B65H 2405/352; B65H 2405/3521; B65H 2801/15

See application file for complete search history.

(56) References Cited

U.S. PATENT DOCUMENTS

| | | | |
|---|---|---|---|
| 7,597,187 B2 | 10/2009 | Bausenwein et al. | |
| 10,960,689 B2 * | 3/2021 | Abergel | B41J 11/0085 |
| 2002/0085900 A1 | 7/2002 | Mayer et al. | |
| 2007/0269249 A1 | 11/2007 | Schulz et al. | |
| 2008/0236996 A1 | 10/2008 | Bausenwein et al. | |
| 2013/0293652 A1 | 11/2013 | Spence | |
| 2015/0137445 A1 | 5/2015 | Abergel | |

(Continued)

FOREIGN PATENT DOCUMENTS

| | | |
|---|---|---|
| DE | 29908095 U1 | 10/2000 |
| DE | 102009003443 A1 | 8/2010 |
| EP | 1857287 A2 | 11/2007 |

(Continued)

*Primary Examiner* — Geoffrey S Mruk

(57) ABSTRACT

The object of the present invention is to provide a novel device and method for accurately transporting printable substrates suitable for substrates of various types, sizes and thicknesses. In addition, the invention is suitable for printing machines without contact with the substrate, such as inkjet printing machines.

25 Claims, 7 Drawing Sheets

(56) References Cited

U.S. PATENT DOCUMENTS

2015/0137446 A1   5/2015  Carlson

FOREIGN PATENT DOCUMENTS

Figure 1:
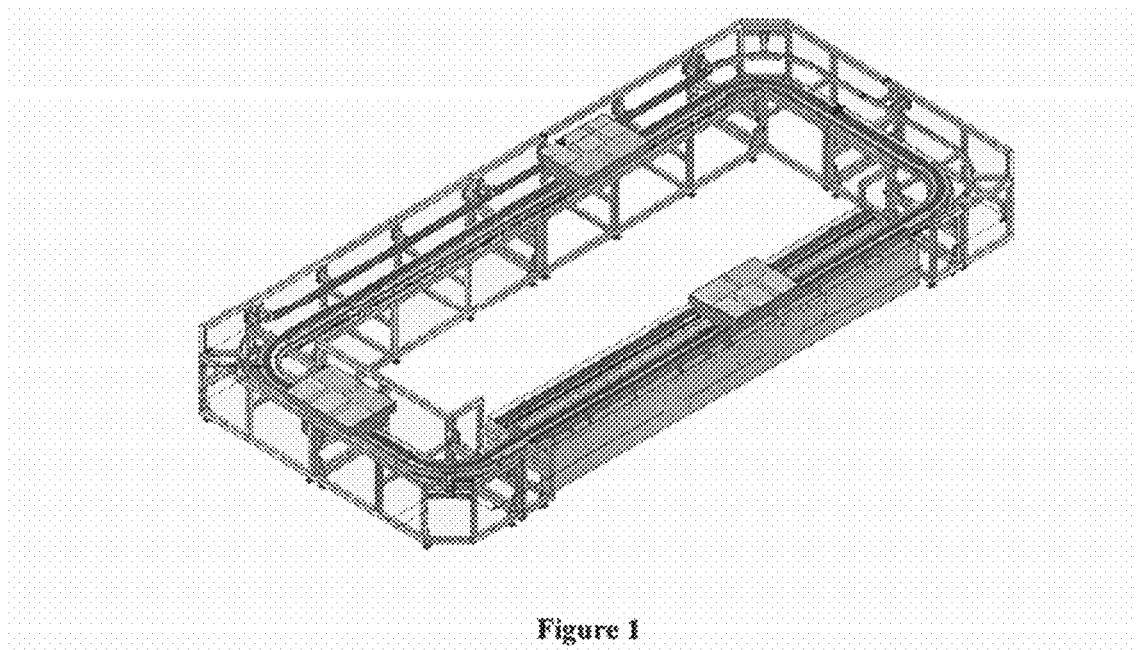

| EP | 1977893 A2 | 10/2008 |
| EP | 2351649 A2 | 8/2011 |
| WO | 2013156540 A1 | 10/2013 |
| WO | 2014076704 A1 | 5/2014 |

* cited by examiner

DEVICE AND METHOD FOR TRANSPORTING SUBSTRATES IN A PRINTING MACHINE

The present invention relates to the field of printing, in particular the field of digital printing without contact with the substrates, and more particularly a device and a method tier transporting printable and printed substrates on all of the treatment stations in a printing machine, the transport of the substrates being performed in a way that allows them to be printed under optimal conditions.

INTRODUCTION

The transport of substrates using automated treatment or industrial manufacturing is a particular technical challenge. Part of the difficulty lies in the movement of a substrate along a chain comprising several treatments of the said substrate, in particular its movement from one treatment station to the next, during the manufacturing/finishing process of the final substrate. Any device for treating a substrate, and more particularly any device for digitally treating a substrate, may advantageously benefit from the advantages of the present invention. By way of a purely illustrative and non-limiting example, the substrate-treatment device is selected from devices for laser cutting, finishing, drying, punching, cutting, folding and/or in particular printing, particularly digital inkjet printing.

This technical challenge of transporting a substrate is further complicated when combining different types of printing and/or drying within the same machine. Conventional (mono- or polychromatic) and/or of varnish printing inks, and/or printed electronics, and/or drying, comprising, e.g., an infrared (IR) and/or near-infrared (NIR) and/or heated airflow drying oven, and/or ultraviolet (UV) and/or light-emitting diode (LED) UV drying, and/or a photonic process may be mentioned as purely illustrative and non-limiting examples. In fact, the combination of several printing modes and various treatments within the same machine requires a transport mode of high precision (e.g., in order to meet the requirements of printed electronics), as sell as a transport mode, in which the components do not affect the efficiency requirements of each of the printing and treatment stations separately and/or in combination; the negative impact that a treatment station may have on a preceding treatment station and/or on a following treatment station along the transport path (e.g., in order to prevent a drying station from affecting the performance of a printing station) may be mentioned as an example. Moreover, implementation must be such that optimal conveying of the variously sized substrates between all the treatment stations is made possible, while the requirements related to the different speeds of each of the treatment stations, as well as sufficient manufacturing rates in order to allow for efficient and cost-effective industrial application are also met.

PRIOR ART

Transports of printable substrates performed with suction belts intended to hold a substrate against said moving belts are known from prior art. Nevertheless, this type el solution, which is well known to those skilled in the art, has some disadvantages. In particular, this type of device, giving rise to air movements and pressure gradients, may cause deformation of the substrates, if these substrates are large. Printing accuracy will thus be compromised. On the other hand, the use of these suction belts with some widely used printing technologies, especially inkjet printing, can cause accidental suction of the ink present in the printheads and thus dry out the printheads. This type of incident requires, in the best case scenario, reprinting of the printheads, and in the worst case scenario, replacement of the dried-out printheads having become, in fact, unusable.

To mitigate these problems, in particular in order to allow precise movement of substrates, prior art teaches techniques using cylinders having a plurality of clamps gripping the substrates by their leading edge relative to the direction of substrate movement, Although this type of solution is suitable for inkjet-type printing machines, it still has several disadvantages. In fact, this system requires that all inkjet heads be arranged in an orbital fashion around a large cylinder. Furthermore, the difficulty of adjusting the position of the printheads for this type of system poses a problem. In fact, for quality printing, the ink ejected from the printheads must form a jet, whose direction is perpendicular to the surface of the substrate. It is obvious that, in this case, the use of a cylinder for transporting and tightening the substrate, whose surface is by definition not flat, involves cumbersome adjustment of the printheads positions. This is also what makes the use of substrates of variable thickness difficult, as changing the substrate requires adjustment of all the printheads. On the other hand, the printing pitch, i.e., the position of the cylinder clamps is fixed, which means that the printing rate remains the same, regardless of the substrate size.

Prior art also teaches substrate transport systems using chains or conveyors, upon which are arranged clamps for gripping the substrates and transporting them on a transport path, a portion of which is flat, which solves the problem of the arrangement of the printheads. However, this type of solution still present the problem of a fixed printing pitch, which imposes a fixed rate and thus creates the additional problem of not being able to use differently sized substrates without stopping the printing and proceeding to make a cumbersome adjustment of the clamp positions.

More recently, the Applicant, in their WO2013156540 patent application, proposed a device and as method for transporting printable substrates in a precise fashion, suitable for substrates of various types, sizes and thicknesses, and for making possible variable-pitch printing. It discloses a substrate transport system in a printing machine along a transport path oriented along a longitudinal axis from at least one entry magazine providing the printable substrates, to at least one magazine exit receiving the substrates, characterized in that it comprises movable gripping means, each comprising an opening/closing system ensuring the release or gripping of a substrate, said gripping means comprising front and rear gripping means, gripping a front and rear portion, respectively, of the substrate along the transport path, guiding means for guiding the gripping means along the transport path, at least one drive means ensuring movement of the gripping means along the guiding means, preferably with an independent movement between at least the front gripping means and the rear gripping means, the substrate transport system being thus suitable for gripping each substrate so as to tighten and move the substrates, even if of variable lengths, along the transport path, the guiding means, the gripping means and their associated opening/closing system being controlled by computer means.

Although the device and the method of WO2013156540 already very sufficiently meet the needs of those skilled in the art, the Applicant has now developed a device and, a method for improving the transport of printable and/or printed substrates on all the treatment stations included in a printing machine, in particular, a printing machine without contact with the substrate, such as inkjet printing machines.

EP1977893 (A2) claims a conveyor comprising an elongated guide defining a closed transport path extending through a plurality of treatment stations, a plurality of supports movable on the guide along the course, and each capable of holding a workpiece to be machined, at least one magnet on each support, a row of electromagnets that may be powered individually and extending along the path and capable of exerting a force on the magnets of the supports in order to move the respective supports along the course.

Figure 4:
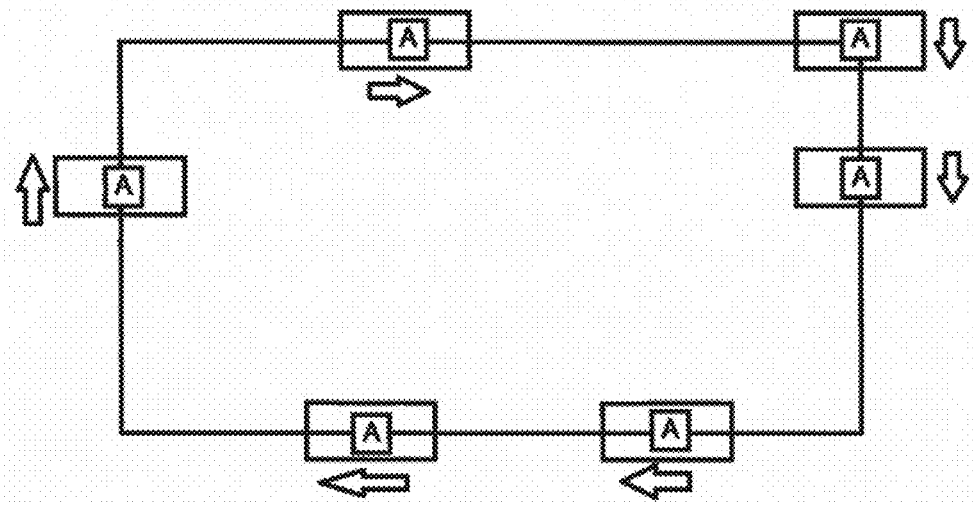

US2013293652 claims a device handling a substrate sheet in a labeling assembly, the device comprising a support track (path) forming a closed path, a labeling area for labeling a substrate sheet, and a carriage/tray movable along the support track, the carriage/tray circulating around the closed path, the said carriage conveying the substrate sheet in one process direction on at least one portion of the closed path through the labeling area. As shown in FIG. 4, the carriage is provided with front and rear roller wheels, which support the carriage 80 along the bearing surfaces of the track, said track including side walls, which appropriately hold the carriage between them on account of the side wheels (provided with springs 86), which help to position the carriage sideways along the track 40. US2013293652 does not explain the mode of movement of the carriages and merely mentions the option of having a built-in motor, a propulsion via a mechanism included in the track 40, or a direct drive system, using pulleys, cables, chains or other similar systems.

US2015137446 claims a card-treatment system comprising a card treatment system, comprising a treatment device configured to sequentially process individual cards, a carriage configured to hold an individual card and move the card toward the treatment 2D device and a transport loop assembly configured to support the carriage, the carriage comprising a driven roller configured to engage the loop and move the carriage along the loop, the driven roller being operatively connected to a drive for creating rotation of the driven roller.

INVENTION—INTRODUCTION

The present invention thus provides a novel device and method for precisely transporting printable and printed substrates suitable for substrates of various types, sizes and thicknesses. In particular, the invention makes it possible to produce variable-pitch prints. In addition, the present invention is suitable for printing machines without contact with the substrate, such as inkjet printing machines and, more particularly, printing machines making a possible to combine, within a single machine, different types of printing and/or drying and/or pretreatments and/or post-treatments (or finishes), such as, purely for illustrative and non-limiting purposes, conventional contactless-printing inks (black, white, mono- or polychromatic), and/or varnish, and/or inks suitable for electronic printing, and/or inks suitable for three-dimensional printing, and/or various and sundry inks, such as functional inks and/or insulating inks (e.g., insulating inks used downstream of an ink print for electronic printing); and/or drying comprising, e.g., an infra-red (IR) and/or near-infrared (NIR) and/or heated-air drying oven, and/or ultraviolet (UV)-lamp and/or UV light-emitting diode (LED) drying, and/or a photonic process; and/or pretreatment, such as a corona-treatment station, and/or a plasma-treatment station, and/or a tape-cleaning system (cleaning roller, brush, etc.), and/or a coating station (flexography, etc.), and/or a sheet-turning system; and/or post-treatment (or finishing) of the substrate in a coating station (e.g., by applying an additional coating, e.g., gilding or other material), e.g., by means of a "gilding" application device, e.g., by applying/pressing a sheet (carrying the said coating or gilding) onto selected areas of the substrate (e.g., comprising an adhesive deposit in a predetermined pattern) in order for the desired portion of the gilding-type sheet to adhere to the selected areas; moreover, this combination of several printing modes and/or various treatments within the same machine is made possible by the high-precision transport mode (e.g., for meeting the printing requirements of electronic printing) according to the present invention, while preventing the transport components from altering the efficiency requirements of each of the printing stations and/or the individual and/or combined treatments (e.g., to prevent a drying station from compromising the performance of a printing station). The present invention also makes it possible to convey the variously sized substrates between all the treatment stations, while meeting the requirements related to the different speeds of each of the treatment stations, as well as sufficient production rates to enable efficient and profitable industrial application.

INVENTION—GENERIC DEVICE CLAIM

Thus, the invention relates to a device for transporting substrates in a printing machine, comprising one or more treatment stations, including at least one printing station, along a transport path from at least one input area (e.g., a magazine) providing the printable and/or printed substrates, to at least one output area (e.g., a magazine) receiving the processed substrates, comprising:
1. a substrate conveyor (preferably of the carousel type) for guiding and moving the substrates through the treatment stations, said conveyor comprising:
    a. A fixed rail, which forms a transport loop; and
    b. Carriages, which hold the substrates in a stationary position (e.g., immobile and flat), and which move on the said rail, while carrying the substrates and;
2. An input area for the substrates (e.g., a substrate storage input magazine);
3. An optional substrate transport system from the input area to the carriage;
4. An optional transport system for the treated substrates from the carriage to the substrate output area (e.g., the output magazine);
5. an output area for the treated substrates (e.g., an output magazine for storing treated substrates);
6. an optional siding for the carriages, said siding being removably connected to the conveyor rail and thus allowing for the addition and/or removal of one or more carriages;

the substrate-transport device thus adapted for moving each carriage/substrate assembly, i.e., moving it by moans of the carriage on the rail along the transport loop, and characterized in that
1. The substrate-transport device comprises a base on which at least a part of the rail is fastened and whose surface is preferably plane;
2. The substrate-transport device comprises a drive system, which allows the carriage to move fin the fixed rail;
3. The carriage comprises a table (preferably a suction table) for holding the substrate in a stationary position relative to the table (e.g., immobile and flat), along the transport loop, during the treatment(s) of the substrate characterized in that the drive system is a linear drive system based on the principle of electromagnetic interaction between a coil assembly (primary assembly) and a path of permanent magnets (secondary assembly), and the primary motor assembly of the linear drive is part of the mobile carriage, and the secondary assembly consists of a path of magnets (magnetic path), said path being fastened on the fixed rail and/or being an integral part thereof, and/or being fastened on the base and/or forming an integral part of the base, and/or fastened on a rigid structure for holding the rail and/or forming an integral part of this rigid structure.

Other features and advantages of the substrate-transport device are described in more detail in the present application. A further object of the invention is to propose a method of transporting printable substrates.

INVENTION—GENERIC CLAIM PROCESS

Thus, the invention also relates to a method for transporting substrates along a transport path, implemented by the substrate-transport device according to the invention. In particular, the invention furthermore relates to a method of transporting substrates in a printing machine, comprising one or more treatment stations, including, at least one printing station along a transport path from at least one input area (e.g., a magazine) providing the printable substrates to at least one output area (for example a magazine; receiving the treated substrates, characterized in that the method comprises the following steps:
1. Optional positioning of a printable substrate in the input area (e.g., storage of a printable substrate in an input magazine);
2. An optional substrate transport system from the input area to the carriage;
3. Guiding and moving the substrate through the treatment stations by a substrate conveyor (preferably of the carousel type), said conveyor comprising:
    a. A fixed rail forming a transport loop; and
    b. Carriages, which hold the substrates in a stationary position (e.g., immobile and flat), and which move on the said rail carrying the substrates; and
4. Optional transport of the treated substrate from the carriage up to the output area the output and storage magazine for the treated substrates);
5. Optional displacement of carriages to a siding, said siding being releasably connected to the conveyor rail making it possible to park and/or add and/or remove one or more carriages from the conveyor;
the substrate-transport method being thus adapted for moving each carriage/substrate assembly, i.e., displacing it by means of the carriage on the rail along the transport loop; and characterized in that
1. The substrate-transport device comprises a base, upon which at least a portion of the rail is fastened, and whose surface is preferably plane;
2. The substrate-transport device comprises a drive system that allows the carriage to move on the fixed rail;
3. The carriage comprises a table, upon which the substrate is held in a stationary position relative to the table (e.g., immobile and flat) along the transport loop during the substrate treatment(s)

characterized in that the drive system is a linear drive system based on the principle of electromagnetic interaction between a coil assembly (primary assembly) and a permanent magnetic path (secondary assembly), and that the primary drive assembly of the linear drive is a part of the mobile carriage and the secondary assembly consists of a path of magnets (magnetic path), said path being fastened on the fixed rail and/or being an integral part thereof, and/or fastened on the base and/or forming an integral part thereof, and/or being fastened on a rigid structure for holding the rail and/or forming an integral part of this rigid structure.

In a preferred embodiment of the present invention, the substrate is held flat in a stationary position relative to the table; however, as the present invention can be applied to sheet-like substrates, and equally to any other type of a three-dimensional object (e.g., cylinders, pens, telephone casings, etc.) it will be appreciated by those skilled in the art that the invention may also advantageously be suitable for these other types of objects, whose immobile positioning may not be qualified as "flat" on the table; according to an alternative embodiment of the present invention, the upper part of the table will comprise a matrix comprising shapes and/or receptacles, in which these other types of three-dimensional objects may advantageously be deposited and/or fastened.

The present invention also relates to the use of the claimed device and/or of the claimed method for transporting the substrates in a printing machine, comprising at least one contactless printing station, in particular for digital inkjet printing. More specifically, this utilization is obtained in a printing machine that comprises at least two different serial, contactless, printing stations, the said printings being selected from the following list:
conventional printing inks (black, white, mono- and/or polychromatic), and/or varnish, and/or inks for printed electronics, and/or inks for three-dimensional printing, or varied and sundry inks, such as, e.g., functional inks and/or insulating inks (e.g., insulating inks used downstream of an ink printing for printed electronics); the combination in series on the transport loop of conventional ink printing, an ink printing for printed electronics (such as conductive inks, whether or not based on nanoparticles) and priming of varnish and/or functional inks and or in ink, all carried out preferably on a single substrate, represents a preferred utilization of the present invention.

Furthermore, according to a particular embodiment of the present invention and, as described in detail in the following specification, the claimed device and method differ from the prior art due to their flexibility of use and the reduction of manufacturing time, as well of as related costs, which makes them especially attractive, particularly for printed electronics, e.g., the manufacture of printed circuits.

Other features and advantages of the substrate-transport process are described in detail in the present application.

INVENTION—FIGURES

The invention, with its features and advantages, will become clearer, when reading the specification in reference to the accompanying drawings, wherein:
FIGS. 1-13 schematically illustrate several aspects and embodiments of the invention.

The present invention has many advantages over the prior-art techniques. These advantages offered by the present invention will be further illustrated in the detailed description of the figures.

Generic Software

In a preferred embodiment of the present invention, the transport device (and thus the printing machine, comprising one or several treatment stations) is controlled by computer means, which, in particular, control the various workstations, and, moreover, gather information from the various sensors installed in the device. These computer means need not be described in detail in the present application and they may be integrated, e.g., in the machine or externally in a separate device. The sensors provide, e.g., substrate positional information, substrate configuration information and/or validation information, following a correctly or incorrectly performed operation. Some information necessary for the implementation of the invention may also be pre-entered into the computer means (e.g., by an operator via a data-capture interface). Such information may, e.g., relate to the shape and/or dimensions of the substrates (e.g., their thickness), the drying power, the thickness of the layer of ink and/or varnish, etc., but it is generally preferred that sensors measure or verify such information. The substrates awaiting printing are generally placed in a per-se known manner in at least one input area, e.g., an input magazine with a storage capacity defined according to the nature of the substrate and the printing requirements. In an exemplary embodiment, an input magazine is provided in order to receive several tens, hundreds, or even thousands of substrates of variable types, thicknesses and dimensions (for example, and without limitations, of a format, whose sides are on the order of one centimeter, e.g., a type A10 format, a more specific example being a credit-card-type format, up to a format, whose sides are on the order of several meters, e.g., a type A0 format or a 2×2 meter format). Upon completion of the printing process, the substrates are guided toward an output area, e.g., stored in at least one output magazine having generally the same storage capacity as the input magazine.

Generic Displacement

A feature of the present invention is therefore the use of a substrate conveyor (preferably of the carousel type) for guiding and moving the substrates through the treatment stations, the said conveyor comprising carriages, which hold the substrates in a stationary position (e.g., immobile and flat) and which move on a fixed rail, allowing each so carriage/substrate assembly to move on the rail, and characterized in that the displacement of the carriages on the fixed rail is controlled by means of a drive system, preferably a linear drive system. This linear drive is based on the principle of electromagnetic interaction between a coil assembly (primary assembly) and a path of permanent magnets (secondary assembly), an interaction that converts the electrical energy into linear mechanical energy. In a preferred embodiment of the present invention, the primary motor assembly of the linear motor is part of the (mobile) carriage, and the secondary assembly consists of a path of magnets (also referred to as a magnetic path), the said track being fastened on the fixed rail (or forming an integral part of the fixed rail), and/or fastened on the base (or forming an integral part of the base), and/or fastened on a rigid structure for holding the rail (or forming an integral part of this rigid structure); in this configuration, the primary carriage assembly thus moves at the same speed as the substrate transported by the said carriage. The carriage can thus be described as an intelligent and/or autonomous carriage, as is done below in the specification.

The length of the path of magnets is preferably similar to the length of the fixed rail or the transport loop. Configurations, in which the magnetic path is located on either or both sides (in a multi-path configuration) of the fixed rail may be considered. Thus, the total length of a path of magnets may have a length that is identical, slightly greater or slightly less than that of the fixed rail; for purely illustrative and non-limiting purposes, the magnetic path will have a length between 0.8 times and 1.2 times the length of the fixed rail, preferably between 0.9 times and 1.1 times the length of the fixed rail.

The advantages of this drive technology are numerous. For illustrative and non-limiting purposes, we mention:

The direct coupling of the mobile carriage to the moving part of the motor, which eliminates the need for transmission elements, such as drive belts, rack gears or worm gears, ball screws, etc.

There is little or no mechanical wear, as there is no contact with the moving parts, resulting in excellent reliability and a long service life;

The possibility of individually controlling the speed and/or acceleration and/or deceleration of each carriage; it is also important to note that this individual control can be done at any time and/or at any point of the transport loop, unlike the device claimed in EP1977893 (A2), whose supports are controlled by a section predefined by the electromagnets arranged along the transport path; it is also important to note that this individual control may be different for each carriage for any given location, Reducing the number of mechanical components in order to minimize maintenance and thus reducing the cost of using this technology.

FIG. 1 provides a schematic overview of the substrate-transport device according to the present invention. It shows the carousel-type substrate conveyor for guiding and moving the substrates, said conveyor comprising a fixed rail, which forms a closed transport loop (in the figure, a rectangle with rounded corners); carriages (three carriages in the figure), which hold the substrates (three rectangular substrates per carriage) in a stationary position (flat, in the figure), and which move on said rail carrying the substrates, the center fixed rail, as well as the magnetic path positioned at its center; the fixed base (whose length is slightly less than one length of the side of the rectangle forming the transport loop, in this illustration); as well as a simplified view of the electrically conductive rails, which, in this configuration, form a closed loop (with the same shape as the transport loop) of a greater length than the fixed rail, as it is located outside the loop formed by the rail. To make it easier to understand this figure, the treatment stations were not shown; for purely illustrative purposes, the positioning of the printing stations along this transport loop coincide with the position of the base so as to fully benefit from the advantages of the present invention.

Figure 2:
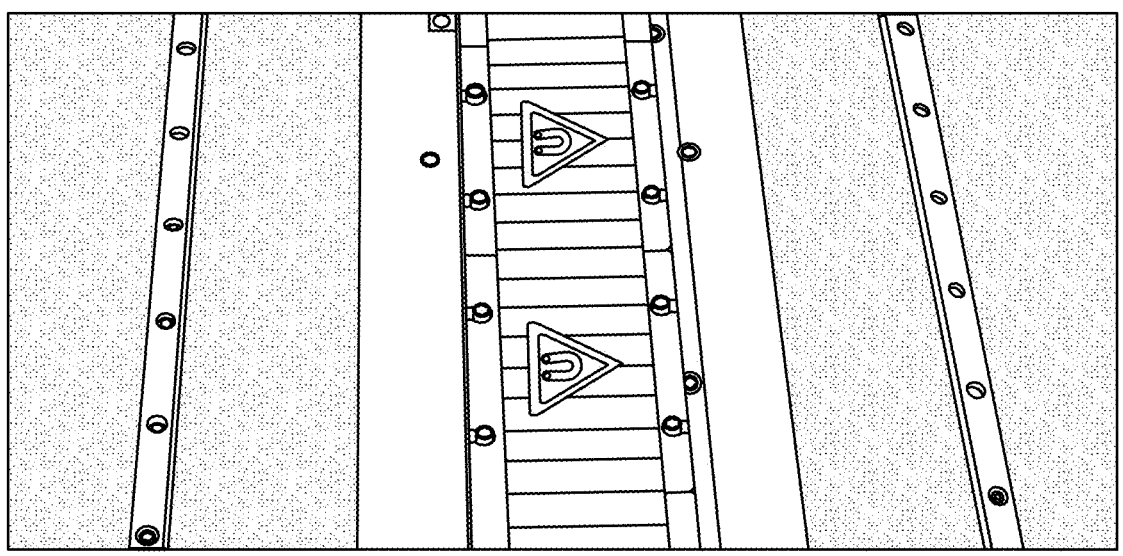

FIG. 2 provides a schematic view of the secondary assembly, which consists of aa path of magnets (also called a magnetic path), said path being fastened on the fixed rail, in this illustration. It is also possible to identify in FIG. 2, the base, the electromagnets, the dual V-guide at the ends of the fixed rail, as well as the two slides situated on either side of the fixed rail, the said slides being explained in detail in the specification below.

Device—Overview

Figure 3:
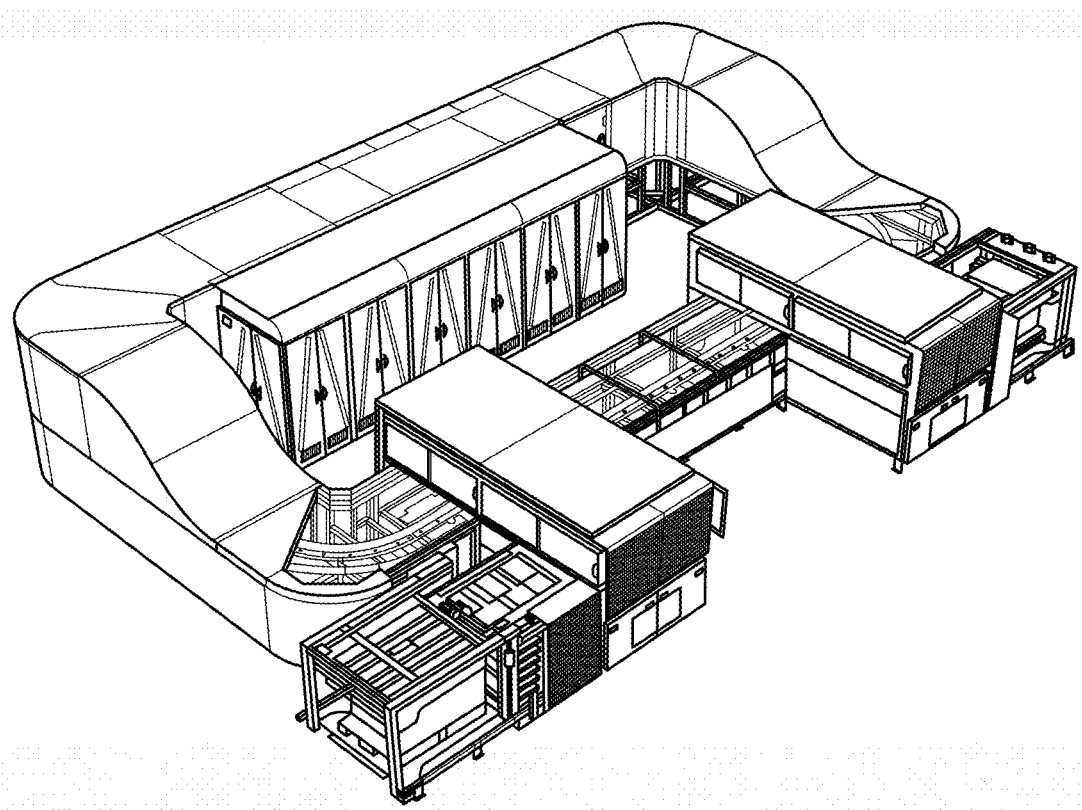

FIG. 3 provides a schematic overview of the substrate-transport device in a printing machine comprising a plurality of treatment stations according to the present invention. It shows the carousel-type substrate conveyor for guiding and moving the substrates through the treatment stations, the said conveyor comprising a fixed rail, which forms a closed transport loop, and carriages (not shown), which hold the substrates in a stationary (e.g., flat) position and which move on said rail carrying the substrates, a substrate storage input magazine to the left on the figure, a substrate-transport system for the input magazine up to the carriage, a system for transporting treated substrates from the carriage up to the output magazine, and a storage output magazine for the treated substrates to the right on the figure. The "Alphajet"

block located at the top left on the figure and in this configuration positioned inside the loop reflects the printing and drying stations; particularly in this configuration, a combination in series of conventional ink printing, the printing of inks its suitable for printed electronics (such as conductive inks, whether or not based on nanoparticles) and varnish printing and/or functional inks and/or insulating inks.

Transport Loop

A feature of the present invention is thus the use of a substrate conveyor (preferably of the carousel type) for guiding and moving the substrates through the treatment stations, the said conveyor comprising carriages, which hold the substrates in a stationary (e.g., flat) position, and which move on a fixed rail, which forms a transport loop, e.g., a closed transport loop. The shape of the transport loop may be of any suitable type. Its length will itself be determined according to the number of treatment stations included within the printing machine. In particular, the printing machine according to the present invention comprises at least one printing station not in contact with the substrate (e.g., two, three, four or more printing stations) and at least one drying station two, three, four or more drying stations); the printing station may advantageously be selected from a conventional inkjet printing station (black, white, mono- and/or polychromatic) an for a varnish jet printing station, and/or an inkjet printing station adapted to printed electronics (e.g., conductive ink, whether or not based on nanoparticles), and/or an inkjet printing station adapted for three-dimensional printing, and/or a printing station with various and sundry ink jets, such as functional inks and/or insulating inks (e.g., insulating inks used downstream of an ink print for printed electronics); the drying station may advantageously be selected from an infrared drying station (IR) and/or a near-infrared drying station (NIR) and/or a heated air drying station, and/or an ultraviolet (UV) lamp drying station and/or a UV light-emitting diode. (LED) drying station and/or a drying station by phototonic process. For illustrative and non-limiting purposes, we mention the optional use of one or more pre-treatment stations, e.g., a corona-treatment station, and/or a plasma-treatment station, and/or a strip-cleaning system (cleaning roller, brush, etc.), and/or a coating station (flexography, etc.), and/or a sheet-turning system; and/or the optional use of one or more post-treatment (or finishing) stations, such as, e.g., a sheet-turning system and a coating station (e.g., by applying an additional coating, e.g., gilding or other material) on the substrate, e.g., by means of a "gilding"—application device, e.g., by applying/pressing a sheet (carrying said coating or gilding) unto selected areas of the substrate (e.g., comprising an adhesive deposit in a predetermined pattern) so as to make the desired portion of the gilding-type sheet adhere to the selected areas. This combination of several printing modes and/or various treatments within the same machine is made possible due to the high-precision-transport mode according to the present invention, while preventing the transport components from impacting the efficiency requirements for each of the printing stations and/or treatments separately and/or in combination. The present invention thus makes it possible to convey the substrates of various dimensions/sizes between all the treatment stations, while meeting the speed requirements (whether they be different or identical) of the substrates, passing through each of the treatment stations, as well as providing sufficient manufacturing rates to allow for efficient and profitable industrial application. The drive technology, in particular the linear-drive technology, used for transporting the substrates makes it possible to control the speed of each carriage separately; this then makes it possible to accelerate or decelerate the speed of a carriage upon request, or change the speed of one carriage relative to another. Hence, in a particular embodiment of the present invention, at time "t", the speed of at least one carriage (transporting substrates) moving along the transport loop varies from the speed of a another carriage (transporting substrates) moving along the transport loop; for example, the speed of at least one transport carriage moving substrates through a treatment station varies from the speed of a carriage transporting substrates moving either through another treatment station or other sections of the transport loop. This ability to individually control the speed and/or acceleration and/or deceleration of each carriage, as it moves along the transport path, represents an exceptional advantage according to the present invention. This affords the possibility of fully benefitting from the performance of each of the treatment stations by adjusting the speed of the carriage according to the type of treatment desired. Thus, in a particular embodiment, the present invention also allows for printing and/or drying, and/or various variable-pitch treatments.

In a particular embodiment of the present invention, the transport loop does not comprise a right angle; on the contrary, its shape will preferably be selected such that it comprises only linear straight parts joined by means of free-form curves ("arcs").

Naturally, other alternative embodiments are conceivable for the transport loop. For illustrative purposes, we mention the variant in FIG. 4, in which the carriages do not follow curves (turns), when moving along the carousel; shown are the carousel-type loop, six carriages, each supporting a substrate "A," each substrate being stationary on its designated carriage, as is the direction of movement, represented by arrows, of each of the carriages.

Figure 5:
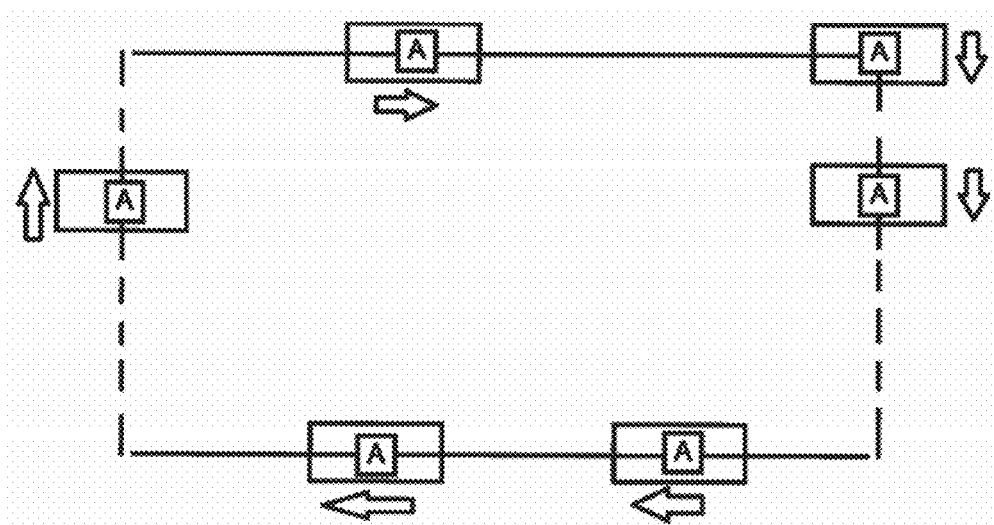

For illustrative purposes, we also mention the variant in FIG. 5, in which the carriages do not follow curves (turns) during, their motion, and the loop comprises at least one rail (e.g., two parallel rails) situated at a certain height, and at least one rail (e.g., two parallel rails) perpendicular to the first rail and situated at another height, which involves the use of a system for raising and/or lowering the carriage (like an elevator) in order to pass from one rail to another.

Even if these variants are not preferred in the context of the present invention, they could nevertheless be useful, e.g., in the case there is a limited amount of available space for installing the transport device, whereby this inconvenience would call for more compact transport solutions.

In a particular embodiment of the present invention, the transport loop is square or rectangular and with rounded corners.

In a particular embodiment of the present invention, the treatment stations, e.g., the printing and/or drying stations are situated in a straight linear portion of the transport loop.

The usual rotational direction of the carriages along the transport loop is generally defined according to the arrangement of the printing and/or drying stations and/or alternative substrate treatment stations(s). Thus, it may be clockwise or counterclockwise. Another advantage of the linear drive technology according to the present invention is the ability to reverse the rotational direction, if required. Hence, in a particular embodiment of the present invention, the carriage and the substrate(s) held in a stationary (e.g., flat) position on the carriage may move in either rotational direction on the transport loop. This feature makes it possible to obtain, e.g., more than one passage in a printing and/or drying station and/or another station for treating the substrates, and/or in a combination of two or more, or all of these aforementioned positions. This flexibility can be particularly advantageous, e.g., in the case of temporarily reduced performance or according to the relevant type of treatment station; by way of non-limiting illustration, a treatment station may require repeated passage[s] of the substrate in order to attain the desired printing resolution (for a printing station) and/or the desired drying quality (e.g., for a drying station, whose drying power, one would not want to increase) and/or one may have to perform multi-passes, when not needed for other treatment stations. Controlling the movements of the carriages in an autonomous fashion thus constitutes a considerable advantage of the present invention. Thus, the carriage can be described as an intelligent and/or autonomous carriage, as done below in the present specification.

In principle, the substrates only pass the loop on their selected carriage after being held in a stationary (e.g., flat) position on the carriage near the input and substrate-storage magazine up to their point of their removal from the said carriage, near the output and treated substrate-storage magazine.

However, and this represents an additional advantage of the present invention, two or even several transport-loop passes are conceivable for the substrate. Thus, in a particular embodiment of the present invention, the substrate may perform more than one pass in a printing and/or a drying and/or alternative-substrate treatment station, and/or in a combination of two or more or all of the above, without leaving its carriage. This feature may be particularly useful, when a printing, and/or a drying and/or alternative-substrate treatment station does not attain the required performance, e.g., as regards printed-image resolution for a printing station; i.e., a second pass under the station with reduced performance will solve this problem without having to change the defective station in a rush.

Base—Rail—Wheels

A feature of the present invention is therefore the use of a substrate conveyor (preferably of the carousel type) for guiding and moving the substrates through the treatment stations, the said conveyor comprising one or more carriages that hold the substrates in a stationary (e.g., flat) position, and which move on a fixed rail along the transport loop during the substrate treatments, and characterized in that at least a portion of the rail is fastened on a base, whose surface is preferably flat; the length of the fixed rail being preferably identical to that of the transport loop.

Figure 6:
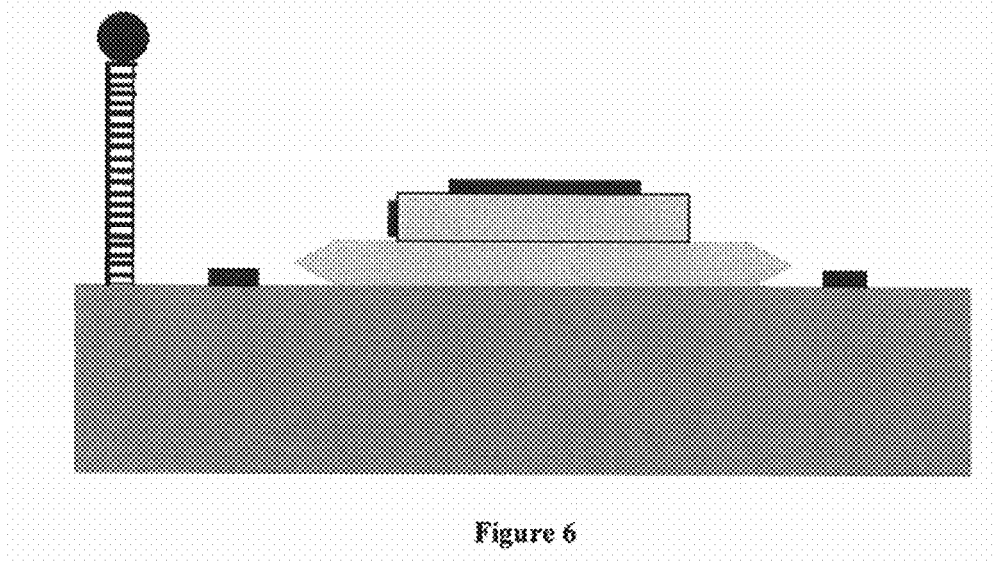

FIG. 6 schematically illustrates this base-rail assembly. It shows, for illustrative purposes, a granite base, which forms the dark gray base, upon which a fixed rail with a double V-guide is fastened; there is an optional holding, part, which is fastened on the fixed rail, and upon which is fastened, on its left, a ruler, which will be described in the specification below, and on its top, the path of magnets already described above. FIG. 6 also illustrates, in a very schematic way, elements, which will be described in more detail in the specification below, i.e., slides, on either side of the fixed rail, fastened on the base, and at the left edge of the figure, a set of electrically conductive rails with a radiating cable transferring (information) data on top.

The dimensions of the base will be selected according to the requirements and applications. By way of non-limiting illustration, and for industrial applications particularly covered by the type of device claimed, the upper flat surface of the base will be arranged at a height off the ground of between 50 and 80 cm, with a transverse width between 40 and 120 cm, e.g., between 60 and 100 cm, and a length of between 200 and 1,200 cm, e.g., 500 and 800 cm.

In a particular embodiment of the present invention, the total length of the base(s) of the transport device is selected such as to cover the entire space below the printing stations of the transport loop. More particularly, if the total length of the printing stations is the value X, the total length of the base(s) of the transport device will be at least X, so as to guarantee the desired flatness under the printing stations; however, as one or more of these base(s) represent(s) a load and a significant financial investment, it is preferable to limit their total length to values less than 3 times X, preferably less than 2 times X, e.g., less than 1.5 times X, i.e., less than 1.2 times X.

In a particular embodiment of the present invention, the total length of the base(s) of the transport device is likewise selected, such as to cover the entire space below the drying stations of the transport loop. More particularly, if the total length of the drying stations is the value Y, and the total length of the printing stations is X, the total length of the base(s) of the transport device will be at least (X+Y), so as to guarantee the desired flatness under the drying and printing stations; however, as one or more of these base(s) represent(s) a load and a significant financial investment, it is preferable to limit their total length to values less than 3 times (X+Y), preferably less than 2 times (X+Y), e.g., less than 1.5 times (X+Y), i.e., less than 1.2 times (X+Y).

In a particular embodiment of the present invention, the total length of the base(s) of the transport device is likewise selected, so as to cover the entire space below the other treatment stations (which are neither printing, nor drying stations) of the transport loop as pre- and/or post-treatment stations, by way of illustration. More particularly, if the total length of the other treatment stations is the value Z, the value of the total length of the drying stations is Y, and the total length of the printing stations is the value X, the total length the base(s) of the transport device will be at least (X+Y+Z), so as to ensure the desired flatness under all drying, printing and other treatments stations however, as one or more of these bases represent a load and a significant financial investment, it is preferable to limit their total length to values less than 3 times (X+Y+Z), preferably less than 2 times (X+Y+Z), for example less than 1.5 times (X+Y+Z) i.e., less than 1.2 times (X+Y+Z).

In an alternative embodiment of the present invention, the total length of the bases) of the transport device is less than half the length of the transport loop, less than 0.4 times the length of the transport loop, e.g., less than one third of the length of the transport loop.

In a particular embodiment of the present invention and, more particularly, depending on the length of the transport loop and/or the layout of the printing and/or drying and/or another treatment stations, one, two or several bases will be provided in the transport device.

The base, its flatness and dimensions therefore represent important features according to certain variants of the present invention. Thus, the base forms the stable foundation/solid seat of the transport-loop rail at the most critical locations, e.g., below the printing stations. More particularly, the Applicant has found that the base makes it possible to effectively solve the vibration problems encountered with the prior-art transport devices, thus making it possible to improve the transport of printable and/or printed substrates for the whole of the treatment stations, including in a printing machine, in particular a printing machine without contact with the substrate, such as inkjet printing machines. This explains the choice of a polishable firm rock, generically referred to as marble, such as, e.g., granite, and/or basalt, and/or porphyry, and/or serpentinite, . . . and/or gneiss, and/or sandstones, and/or gaps, and/or limestones and/or other conglomerates, as component(s) of a base used in a preferred embodiment of the present invention. It is obvious that those skilled in the art will know how to select other materials, whether or not similar to marble, which similarly al meet the requirements of the absence of vibrations in order to ensure the quality of prints; by way of illustration, we mention, e.g., granite (a generic term used in construction and designating any natural material having the appearance of a rock, which is generally very solid and wear-resistant), and/or composite stones, and/or ceramics, and/or technical ceramics, and/or cast iron. Moreover, the Applicant has found that the weight ratios between the base, the carriage and the substrate(s) were important features for combatting the vibrations of the transport device; thus, in an alternative embodiment of the present invention, the ratio between the weight of a carriage of a length L and the weight of a length L of the base will be less than 0.3, e.g., less than 0.2; in an alternative embodiment of the present invention, the ratio between the weight [of a carriage of a length L and substrates arranged on said carriage] and the weight of a length L of the base will be less than 0.3, e.g., less than 0.2.

Any carriage guide system on the rail may advantageously be used in the context of the present invention. In a particular embodiment of the present invention, the carriage guide system on the rail is selected among the V-guide systems; preferably with a double V-guide, as shown in FIG. 6 (a rail with V-shaped "male" ends) and FIG. 7 (V-shaped "female" wheels fastened on the carriage). In a particular embodiment of the present invention, the carriage comprises at least one V-shaped wheel, preferably two V-shaped wheels, more particularly at least four V-shaped wheels.

According to a preferred embodiment of the present invention, the guide system for the carriage on the rail comprises at least one pair of guide elements arranged on either side of the rail (e.g., wheels), each pair of guide elements (e.g., a pair of wheels) having a mechanism for guiding the carriage in straight sections, as well as in turns. By way of non-limiting illustration, each pair of guide elements will comprise a support bar connecting the two guide elements (e.g., the two wheels) with one another, the said support bar comprising a pivoting axis connected to the carriage to ensure optimal guidance of the carriage along the rail and, in particular along the turns formed by the transport loop.

In a particular embodiment of the invention, the guide system for the carriage on the rail comprises three guide elements (e.g., three wheels), two on one side and one on the other side of the rail, so as to allow the carriage to make the turns created by the transport loop and also follow the linear directions.

Figure 7:
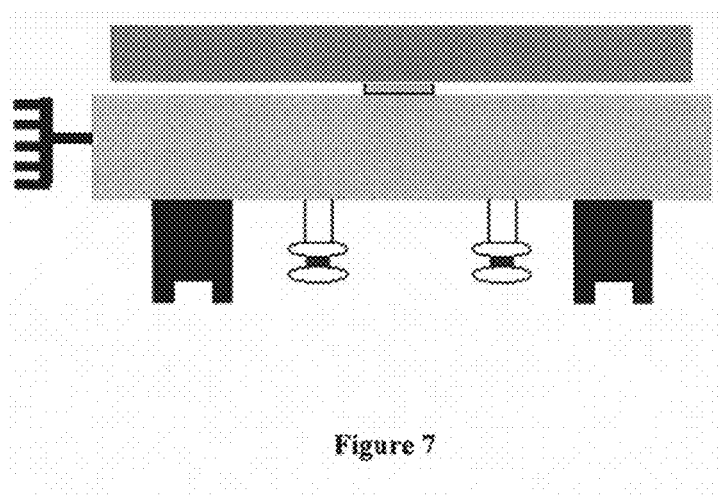
Figure 8:
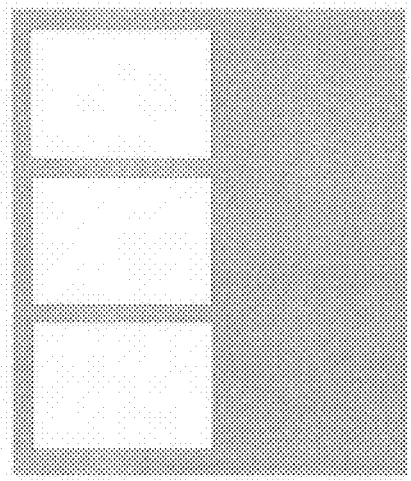

FIG. 7 thus illustrates a carriage variant according to the present invention, said carriage comprising a structural base shown in light gray in the figure with a table dark gray) on top for supporting the substrates, and which will be detailed below in the specification; also visible under the base are two V-shaped wheels surrounded by two slide pads, which will be detailed below in the specification, and to the left of the base, a sliding contact element (used to supply power to the carriage). A variant of FIG. 7 (not shown) will be to arrange the V-shaped wheels such that they surround the slide pads, which preferably means that the slides will be positioned on the fixed rail and the height of the slide pads will be less than the V-shaped wheels under the base of the carriage.

In a particular embodiment of the present invention, the carriage guide system thus comprises at least one rail connected to the carriage wheel(s) according to a V-guide device; this makes it possible to guide the wheel(s) of the carriage in the Vs of the rail; preferably a rail with double V-guide for guiding the V-shaped wheels of the carriage. Thus, in a particular embodiment of the present invention, the carriage is provided with four V-shaped wheels (preferably symmetrically, two by two, relative to the center of the carriage), two of the wheels being guided by the V on one side of the rail, and the other two wheels being guided by the V on the other side of the rail.

In a particular embodiment of the present invention, the rail is positioned centrally over the width of the base; thus, in an alternative embodiment of the present invention, the center of the width of the rail is at a distance of less than 20 cm, e.g., less than 15 cm from the center of the width of the base. In a particular embodiment of the present invention, the center of the width of the path of magnets is aligned with the center of the width of the fixed rail.

Thus, according to one feature of the present invention, at least a portion of the rail is fastened on a base or forms an integral part of said base. A base could advantageously be used along the entire length of the rail for its fastening. However, as these bases and, in particular the bases defined above, represent a load and a significant financial investment, it is also possible to provide any suitable type of recessed rigid structure for fastening the rail—or for incorporating the rail into said structure—along the transport path; by way of illustration, we mention a mechanically welded frame and/or a profiled frame. In a particular embodiment according to the present invention, a recessed rigid structure is used for fastening the rail (or incorporating the rail into the said structure) outside the printing and/or drying stations and/or any other substrate treatment station. Thus, in an alternative embodiment of the present invention, the total length of the recessed rigid structure used for fastening the rail of the transport device is greater than or equal to halt the length of the transport loop greater than or equal to 0.6 times the length of the transport loop, e.g., greater than or equal to two thirds of the length of the transport loop.

Displacement Sensor

In a preferred embodiment of the present invention, the transport device is equipped with at least one displacement detection system (or sensor), preferably a linear displacement detection system (or sensor), for measuring the displacement (position, speed, acceleration and/or deceleration) of the carriage relative to the fixed rail. Any displacement detection system (or sensor) meeting the necessary precision requirements may advantageously be used in the device according to the present invention. By way of non-limiting illustration, we mention a displacement sensor comprising a mobile and a fixed part, e.g., an optical ruler. In a preferred embodiment of the present invention, the fixed part of the displacement sensor (e.g., the optical ruler) preferably consists of a linear ruler, preferably positioned along the transport loop under the printing station and/or the drying stations and/or any other substrate treatment station requiring increased accuracy of measurements of the position, speed, acceleration and/or deceleration of the carriage along the transport loop, preferably under the printing stations. This (preferably linear) ruler may therefore advantageously be an integral part of the rail and/or fastened on the rail and/or on the base of the rail, and/or an integral part of the base of the rail, and/or fastened on the rail structure and/or an integral part of the rail structure. The presence of the (preferably linear) ruler thus makes it possible to determine, at any time, the positioning, speed, acceleration and/or deceleration of the carriages on the transport loop. In a preferred embodiment of the present invention, the carriage incorporates at least one reader (preferably an optical reader), which forms the moving part of the displacement sensor.

FIG. 1 provides a schematic overview of the substrate-transport device according to the present invention. It shows the carousel-type substrate conveyor for guiding and moving the substrates, the said conveyor comprising a fixed rail, which forms a closed transport loop, and carriages that hold the substrates in a stationary (e.g., flat) position, and which move on the said rail while transporting the substrates, and allowing for the control of the displacement on account of the linear ruler which, in this FIG. 1, coincides with the fixed rail. FIG. 6 also schematically illustrates the ruler, which is positioned in this configuration to the left of the optional holding part, which is fastened on the fixed rail.

In a preferred embodiment of the present invention, the transport device is equipped with at least one displacement sensor, preferably a linear displacement sensor, for measuring the displacement (position, speed, acceleration and/or deceleration) of the carriage relative to the treatment station(s). Any displacement sensor meeting the necessary precision requirements may advantageously be used in the device according to the present invention, By way of non-limiting illustration, we mention a displacement sensor comprising a mobile and a fixed part, e.g., a magnetic optical ruler. In a preferred embodiment of the present invention, the moving part ("moving," in the sense that it moves along with the carriage) of the displacement sensor (e.g., the magnetic sensor) preferably consists of a linear ruler attached along a longitudinal axis (i.e., in the direction of travel of the carriage) on the carriage or being an integral part of the carriage). The presence of the preferably linear ruler thus makes it possible to determine, at any given time, the positioning, speed, acceleration and/or deceleration of the carriages on the transport loop relative to the treatment station(s). In a preferred embodiment of the present invention, at least one treatment station, preferably at least one printing station, preferably all the printing stations, or even all the treatment stations, incorporate at least one reader (preferably a magnetic reader), which forms the fixed part of the displacement sensor.

In a preferred embodiment of the present invention, the transport device is equipped with at least one "O" displacement sensor for measuring the displacement of the carriage relative to the rad, and at least one "M" displacement sensor for measuring the displacement of the carriage relative to the treatment station. In a particular embodiment of the present invention, the "O" sensor reader and the "M" sensor ruler are situated on the carriage. In a particular embodiment of the present invention, the ruler of the "O" sensor forms an integral part of the rail, and/or is fastened on the rail, and/or is fastened on the base of the rail and/or forms an integral part of the rail base, and/or is fastened on the rail structure, and/or forms an integral part of the rail structure. In a particular embodiment of the present invention, the tea "M" sensor reader is fastened on a fixed (or mobile) element of a printing station and/or a drying station, and/or another treatment station. In a particular embodiment of the present invention, the "O" sensor is an optical linear displacement sensor and the "M" sensor is a magnetic linear displacement sensor. Indeed, the Applicant has discovered that due to the combination of these two displacement sensors, an exceptional level of measurement accuracy (e.g., on the order of one micrometer on the critical sections of the transport loop. e.g., in the micrometer range, on transport loop lengths in the one-meter range) could be achieved, thus allowing for optimally managing the positioning and/or speed and/or acceleration and/or the deceleration of the carriages along the transport loop. The dual positioning control of the readers/sensors, as described above, also adds other key advantages to the present invention, as described below. In fact, having the "O" sensor reader arranged on the carriage makes it possible to avoid any problems of transmitting the information measured between the reader and the active elements of the carriage, e.g. controlling the primary motor assembly of the linear drive of the mobile carriage; this responsive control makes it possible to improve the intelligent and/or autonomous nature of the carriage by making it possible to minimize the delays between the measurement and the corresponding induced action. Moreover, having the ruler of the "M" sensor arranged on the carriage and therefore the corresponding "M" sensor reader on a fixed (or mobile) element of a treatment station (e.g., a printing and/or drying and/or alternative treatment station) makes it possible to avoid any problems of transmitting the measured information between the reader and the active elements of the treatment station (e.g. a printing station (e.g., the printheads of said printing station), and/or a drying and/or alternative treatment station) along the transport path. This responsiveness allows the said station(s) to act without delay according to the performed measurement, i.e., it is possible to minimize the delays between the measurement and the corresponding induced action; this responsiveness also makes it possible to avoid having an information exchange system between the carriage and the treatment station in order to obtain this positioning information, which, in addition, reduces costs. Furthermore, the dual positioning control makes it possible to adjust the measurement elements to the requirement(s) of the carriage(s) and the treatment station(s) (e.g., a printing station). In fact, the Applicant has found that the measurement accuracy, and more particularly, the knowledge of the positioning of the movable part (e.g., the carriage), may vary between the carriage(s) and the treatment station(s). Thus, the measurement accuracy between the "O" sensor and the "M" sensor may be different (lower or higher), or equal. In a particular embodiment of the invention, the sensors may be selected according to the requirements of the treatment station (or the carriage), and may therefore differ from one workstation (or carriage) to another. This also allows for cost efficiencies. Indeed, since it is possible to adjust the measurement system to the requirements of the carriage(s) and/or the treatment station(s), the cost of the required parts is optimized.

Slide

In a preferred embodiment of the present invention, the transport device also comprises at least one slide, e.g., a slide arranged on each side of the center fixed rail.

FIGS. 2, 6 and 7 schematically illustrate the components of these slides, which, in this illustration and embodiment, consist of rails and guide elements (e.g., guide pads) fastened on the carriage; in FIGS. 2 and 6, the rails of the two slides are fastened on the base and placed on either side of the fixed rail; in FIG. 7, the slide pads are arranged under the base of the carriage and surround the V-shaped wheels of the guide system. Bear in mind that a variant of FIG. 7 (not shown) will be to arrange the V-shaped wheels such that they surround the pads of the slides, which preferably entails that the slide rails will be positioned on the fixed rail and that the height of the slide pads will be less than the height of the V-shaped wheels below the base of the carriage; in this configuration, the use of a single slide rail is possible, even if this is not a preferred variant according to the present invention.

Any type of slide may advantageously be used according to the present invention.

In a preferred embodiment of the present invention, the slide comprises a rail, preferably two rails situated on each side of the mil (preferably centrally), which are either fastened on the base or form an integral part of said base.

In an alternative embodiment of the present invention, the slide comprises a rail, preferably two rails, which form an integral part of the fixed rail (preferably centrally), and/or are fastened on the fixed rail (preferably centrally), and/or are fastened on the base of the fixed rail (preferably centrally), and/or form an integral part of the base of the fixed rail (preferably centrally), and/or are fastened on the fixed rail structure (preferably centrally), and/or form an integral part of the fixed rail structure (preferably centrally).

In a preferred embodiment of the present invention, the slide is smooth and preferably comprises one or more guiding elements on the carriage, (e.g., "female" elements), preferably at least two, e.g., at least four (as shown in FIG. 7), e.g., gliding pads, In a preferred embodiment: of the present invention, the slide is a dovetail slide.

In fact, without wishing to be limited by this explanation, the Applicant believes that the use of the central rail and its guidance in combination with the aforementioned slide not only meets the requirements of precise displacement of the carriage along the transport loop, but also allows for optimized motion through the curves of the transport loop.

According to an alternative embodiment of the present invention, the length of the slide rail(s) may be identical to the length of the fixed rail or the transport loop. However, and this represents a preferred embodiment of the present invention, the total length of this/these rail(s) will preferably be less than that of the fixed rail, because it will be preferable not to place them in the turns formed by the transport loop; we refer to total length of rail per slide, as the said slide rail may in fact consist of several sections of rail along the transport loop.

In a preferred embodiment of the present invention, the total length of the slide rail of the transport device is selected so as to cover the entire space below the printing stations of the transport loop, More particularly, if the total length of the printing stations is the value X, then the total length of the slide rail of the transport device will be at least X, so as to ensure the desired flatness below the printing stations and meet the requirements for precise carriage displacement along the transport loop. However, since the presence of this slide rail is not essential outside the printing stations, the total length of the slide rail of the transport device will be limited, e.g., to values less than 3 times X, preferably less than 2 times X, e.g., less than 1.5 times X, i.e., less than 1.2 times X.

In an alternative embodiment of the present invention, the total length of the slide rail of the transport device is less than the sum of the lengths of the linear parts of the transport loop, e.g., less than half the length of the transport loop, less than 0.4 times the length of the transport loop, e.g., less than one-third of the length of the transport loop.

In an alternative embodiment of the present invention, when the total length of the slide rail of the transport device is less than the length of the transport loop (and/or when the said rail consists of several rail sections along the transport loop), the width of the initial end (the input in the direction of movement of the carriage) and/or the width of the tail end (the output in the direction of movement of the carriage) of the said rail will advantageously be less than the average width of the said rail; without wishing to be limited by this explanation, the Applicant believes that this makes it possible to ensure optimal insertion (and/or exit) of the guiding element (e.g., of the pad(s)) into the rail, while limiting the mechanical wear, premature degradation of the rails, as well as vibration phenomena, which may interfere with the objectives of the present invention. For example, we mention by way of illustration a V-shaped input and/or an inverted V-shaped output for the slide rail of the transport device.

According to a preferred embodiment of the present invention, the system for guiding the carriage on the fixed rail comprises:

At least one pair of guide elements arranged on either side of the rail (e.g., wheels), each pair of guide elements (e.g., a pair or wheels) having a mechanism for guiding the carriage both in straight sections and in turns, a support bar, which connects the two guide elements with one another (e.g., the two wheels), the said support bar comprising a pivoting axis connected to the carriage in order to ensure optimal guidance of the carriage along the rail and, in particular, along the turns formed by the transport loop; and At least one slide consisting of fixed rail(s) and guiding elements, as described above, the said elements forming a slide connection (for example pads) with the rail(s).

Carriage

A feature of the present invention is therefore the use of a substrate conveyor, preferably of the carousel type, for guiding and moving the substrates through treatment stations, the said conveyor comprising at least one, preferably several carriages, which hold the substrates in a stationary position (e.g., flat), and which move on a fixed rail, which makes it possible to move each carriage/substrate assembly on the rail, and characterized in that the said carriage comprises a table, preferably a suction table, holding the substrate in a stationary position (e.g., flat) relative to the table, along the transport loop during substrate processing. FIG. 7 illustrates the carriage and some of its components, e.g., a substrate support table, the V-shaped wheels of the guide system, as well as the slide pads, and an (electrical) sliding contact element. The dimensions of the carriages and tables will be selected according to the requirements and applications, while allowing for factors, such as bulkiness, weight and machining. By way of non-limiting illustration, we have designed carriages of the (W/L/H) dimensions 800/1250/3000 mm, including (holding) tables of the (W/L/H) dimensions 765/1075/1500 mm.

In an alternative embodiment of the present invention, the carriage is equipped with an identification means allowing for "personalization" during the passage of the carriage, i.e., identification by any station of the device according to the present invention. The present invention may use any carriage-identification technology, preferably contactless.

By way of non-limiting illustration, this identification means may advantageously be selected from RFID (Radio Frequency Identification—technology for identifying objects, making it possible to store and retrieve data remotely, using markers known as "radio tags" (or "transponders")), barcodes, and/or any other technology based on the recognition principle, e.g., an optical transceiver.

By way of nonlimiting illustration, it would be possible to identify the maintenance carriage (e.g., the "inkjet, head-cleaning" carriage inserted into the stream of mobile carriages) and thus prevent it from being exposed to any substrate treatment whatsoever, and prevent the loading and/or unloading of the substrate onto this maintenance carriage.

Table—Holding

According W an alternative embodiment of the present invention, any type of preferably flat upper surface table, and any system for holding the substrate in a stationary position (e.g., flat) on the said table may advantageously be used. Thus, according to a particular embodiment of the present invention, the holding force exerted by the holding system in the stationary position of the said substrate on the table will be greater than any other force that could cause the displacement of the substrate during the treatments of the said substrate and/or during carriage movements. As an illustration of a system for holding the substrate in a stationary (e.g., flat) position on the table, we mention means for gripping or pressing the substrate, e.g., nippers and/or nipper strips. Thus, in order to meet the particular objectives of the present invention, the dimensions of the table will preferably meet the following criteria: a transverse dimension (i.e., perpendicular to the longitudinal axis in the plane of the transport path) at least equivalent to the transverse size of the largest utilized substrate—and a longitudinal dimension at least equivalent to the longitudinal dimension of the largest utilized substrate: an additional advantage of the present invention is that several substrates (identical or different) may be held in a stationary (e.g., flat) position on the table, which demonstrates the exceptional flexibility provided by the device according to the present invention. The upper layer of the carriage shown in FIG. 7 is a simplified schematic representation of the whole holding table (front view). A representation of three identical substrates held in a stationary position on a holding table is described, for illustrative purposes, in FIG. 8 (top view).

Vacuum Table

A feature of a particular and preferred embodiment of the present invention is therefore the use as a holding table of a suction table, which forms part of the transport carriage and which makes it possible to maintain the substrates in a stationary (e.g., flat) position along the transport loop. The suction tables and their operation are well known to those skilled in the art and they will therefore have no problem using a suction table suitable for the present invention. The structure and dimensions of the suction table are not critical, provided it fulfills its purpose of holding the substrate in a stationary (e.g., flat) position. Thus, according to a particular embodiment of the present invention, the holding force in the stationary position of said substrate on the suction table will be greater than any other force that could cause the displacement of the substrate during the treatments of said substrate and/or during the motions of the carriage by way of non-limiting illustration, we mention the potential influence of drying by a heated air current upon the position of the substrate on the suction table, an influence that must therefore be thwarted by the holding force of the suction table.

Suction Baseplate

The upper part of the suction tables is generally referred to as the suction baseplate, which is usually made mostly of metal and/or polytetrafluoroethylene (also known as Teflon) perforated by a multitude of holes, allowing the table to perform suction and therefore holding due to this suction force of the substrate on the baseplate. In a preferred embodiment of the present invention, a baseplate of the type described above is not used as illustrated below in the description of the figures.

Active Suction Area

Figure 9:
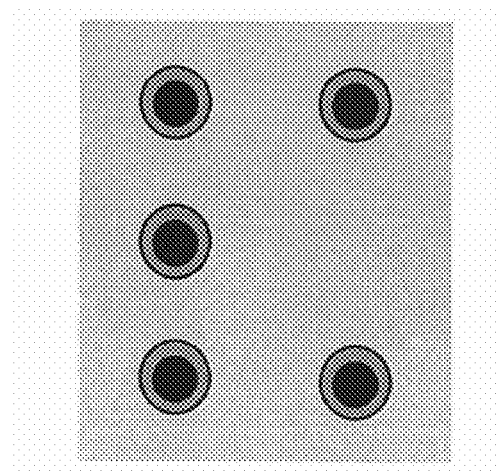
Figure 10:
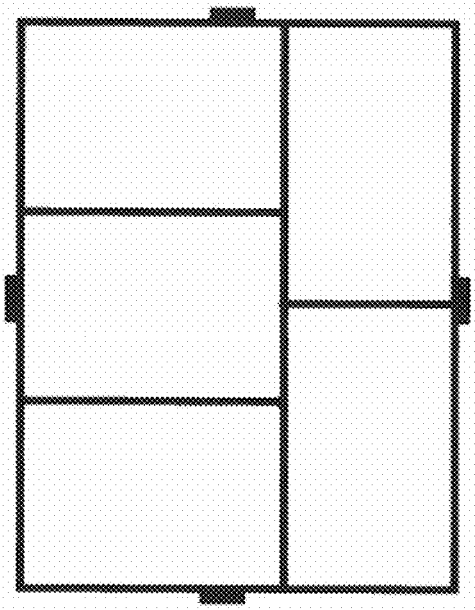

The lower part of the suction tables generally consists of an active suction area (active suction assembly). The suction tables and their operation are well known to those skilled in the art and they can therefore easily use a suction table comprising an active suction area suitable for the present invention, i.e., an active suction area sufficiently powerful to hold the substrate in a stationary position (e.g., flat) on the suction table. By way of illustration, an active area of active suction is shown in FIG. 9, which shows that the active suction area comprises five suction units (represented in the figure by fans), which are preferably individually adjustable. Bear in mind that it was already made clear that a major objective of the present invention is to prevent the components of the transport device from compromising the efficiency requirements of each of the printing stations and/or treatments. The same obviously applies to the suction table and, in the context of the present invention, we favor controlling (e.g., by varying the suction power), preferably controlling individually, the constituent elements of the active suction area (of the active suction unit). For a better understanding of the present specification and the claims, we will characterize the active suction assembly comprising at least two suction elements by using the term "compartmentalized." Thus, in a preferred embodiment of the present invention, the active compartmentalized suction assembly (the active suction area) will comprise at least two, preferably at least three, preferably at least four, e.g., at least five suction elements, whose power may be controlled, preferably individually. A representation of five suction elements (five fans) is described for illustrative purposes in FIG. 9 (bottom view). The assembly formed by the active suction area is therefore an essential component of the suction table, the said active suction assembly preferably forming the lower layer of the table. In an alternative embodiment of the present invention, this active suction assembly is attached to the passive layer situated immediately above, e.g., by means of clamps; for illustrative purposes, this active suction assembly may be incorporated in a frame, which is preferably attached to the passive layer located immediately above, for example by means of clamps. In another alternative embodiment of the present invention, this active suction assembly is attached to the base of the carriage or an intermediate element, which itself is attached to the base of the carriage.

Passive Suction Area—Chambers

In a preferred embodiment of the present invention, the suction table also comprises a chambered structural layer (passive suction area/passive suction assembly) situated above the active suction area (between the active suction area and the substrate), which helps to compartmentalize the suction flows. This structural layer is preferably rigid or semi-rigid. For example, this structural layer comprises chambers Ch (or compartments Ch), which are preferably arranged opposite the compartments of the suction area in order to improve the control of the power and/or homogenization of the suction within the chambers. The dimensions of this structural chambered layer (passive suction area/passive suction assembly) are selected according to the requirements and applications; the widths/lengths of this structural layer (e.g., a rectangular, parallelepiped-shaped flame of a height "h") preferably coincide with those of the active suction layer; the heights of this layer (and thus, preferably, also the chambers) are not critical, as long as the layer fulfills its purpose or homogenization and/or control of the suction power of the suction table; by way of nonlimiting illustration, we mention a height "h" of this structural layer (and thus, preferably also of the chambers) between 10 and 50 mm, e.g., between 15 and 30 mm, e.g., 20 mm. This structural layer advantageously comprises at least two, preferably at least three, preferably at least four, e.g., at least five chambers. The number of chambers may advantageously correspond to the number of compartments of the active suction area. However, and this represents a particular embodiment of the present invention, the structural layer is removable (e.g., by means of clamps), and may therefore be replaced, as needed; this will make it possible to use several chambers suitable for the substrates and/or treatments used without having to change the compartmentalized active suction area. According to an alternative embodiment of the present invention, the number of chambers will stay less than 20, preferably less than 10, in order to avoid bulkiness, which is likely to interfere with the performance of the suction area.

By way of illustration, a passive suction area is shown in 10, which shows that the passive suction area comprises five chambers (illustrated in the figure by rectangles—top view); clamps are also visible on all four sides of this frame.

Thus, according to a preferred embodiment of the present invention, the holding table is a suction table, which comprises an active suction assembly, which, is compartmentalized into two or more suction elements (e.g., three, four, five, or more) surmounted by a passive suction assembly, which is compartmentalized into two or more chambers (e.g., three, four, five, or more), characterized in that the number and arrangement of the chambers preferably coincide with the suction elements.

According to an alternative embodiment of the present invention, the surface of the upper part of the chambers consists of one or more dual-purpose grids: these grids will impart a flat surface to the upper part of the passive suction assembly, which will improve the flat positioning of the next layer, and also help distribute the suction flows within each chamber. Thus, a chamber will advantageously comprise on its upper surface at least five, preferably at: least ten, e.g., at least 15 surface sub-chambers defined by the grid mesh. By way of illustration, FIG. 11 describes a structural layer (passive suction area/passive suction assembly), which comprises five chambers, three chambers comprising 21 surface sub-chambers each, and two chambers comprising 18 surface sub-chambers each.

Figure 11:
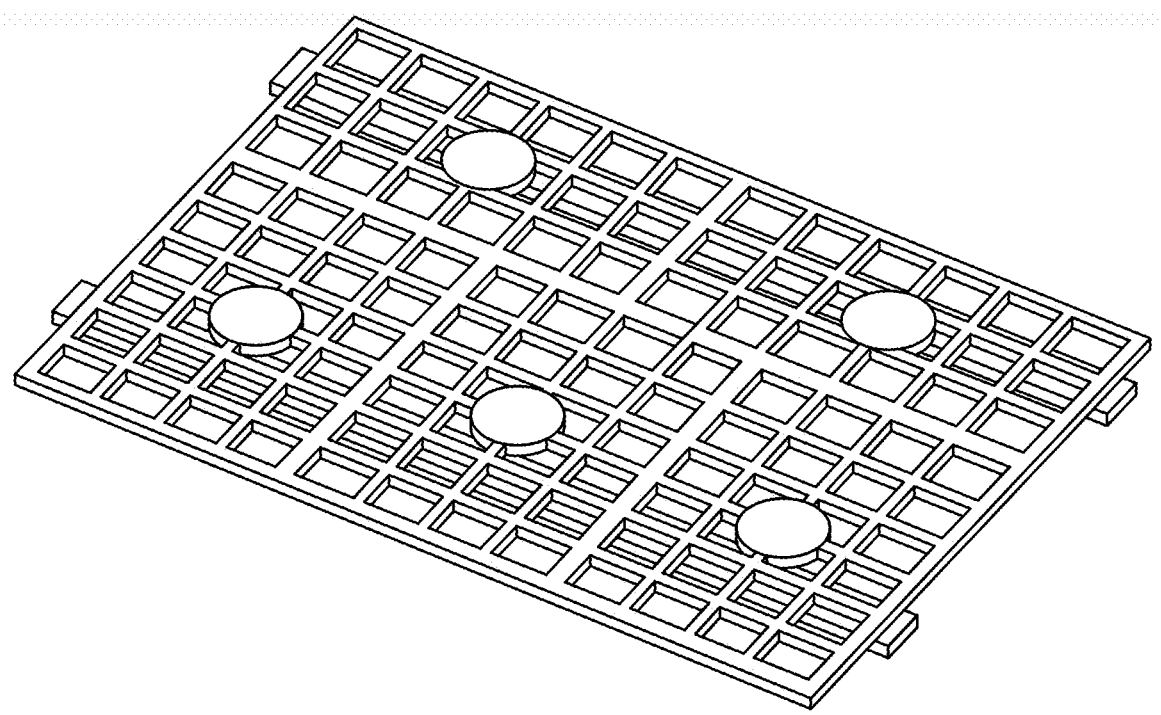

In a preferred embodiment of the present invention, the chambered structural layer (passive suction area/passive suction assembly) also comprises additional suction-homogenization elements, elements that are preferably situated in locations, where the positioning of the fans may risk causing suction peaks and/or swirls that could interfere with the proper operation of the treatment stations. By way of illustration, FIG. 11 shows a structural layer (passive suction area/passive suction assembly), which comprises five additional sue on-homogenization dements in the form of pastilles (discs)) situated Opposite the center of the suction elements of the active suction area, which makes it possible to mitigate any swirling effect and/or suction peak, which could generate said suction elements.

Thus, according to a particular embodiment of the present invention, the suction table comprises an active suction assembly (active suction area), as defined above, in combination with a passive suction assembly (passive suction area), as defined above, so as to control the suction power of the table according to the positioning of the substrates; by way of illustration, this not only allows suction to be optimally balanced, regardless of the position and size of the substrates, but also makes it possible to limit the suction in specific sensitive areas, e.g., when the carriage passes through below the print heads.

Adjustable-Carriage

In a particular embodiment according to the present invention, a system for varying the height and/or orientation and/or a translation/rotation of the holding table (preferably the suction table) is incorporated in the carriage, e.g., a drive system and/or jack(s). This additional system (e.g., this drive and/or jacks) can be extremely useful, e.g., making up for faulty print nozzles and/or increasing the resolution of prints and/or ensuring optimal positioning of substrates below the treatment stations. By way of non-limiting illustration, we mention rotation and/or translational movement of the table allowing for the use of a nozzle to replace a faulty nozzle in order to perform printing at a precise substrate location. By way of non-limiting illustration, a (transversal) micrometric drive for this type of drive is used; displacements may therefore advantageously reach a precision on the order of μm's, and will preferably be limited to maximum values equivalent to cm's in the three dimensions of space.

By way of non-limiting illustration, FIG. 7 illustrates the presence of this element comprising an additional drive; a carriage comprising a structural base is clearly visible in light gray in the figure surmounted by a (dark gray) holding table, including an intermediate member between the table and the base forming this additional drive element, e.g., a micrometric drive for moving the table in a direction perpendicular to the direction of travel of the carriage.

Honeycomb Layer

During the development and enhancements performed on the transport device of the present invention, the Applicant also determined that the surface temperature of the substrate and thus the surface temperature of the upper part of the holding table had a not negligible effect on the quality of the prints (and, in particular, the quality of printed-electronics prints), as well as the performance of the drying stations. Thus, in a preferred embodiment of the present invention, the table (preferably the suction table) comprises a structural honeycomb layer. The Applicant, in fact, developed this particular embodiment of the invention, because the structural honeycomb layer makes it possible to homogenize the surface temperature, as well as improve dissipation of the said temperature throughout the table. What's more, this honeycomb structural layer has several additional features/advantages, which we mention by way of non-limiting illustration:

An upper surface that is sufficiently flat for holding the substrate in position;
Allows for the passage of air in order to create a depression behind the substrate thereby ensuring optimal holding for the suction-table option;
Limiting the effects of substrate thermal conduction, on account of its slight contact surface;
Limiting the effects of thermal conduction with the lower and upper layers of the table (which has proven especially appropriate for certain treatment stations, e.g., infra-red drying stations);
Contributing to the elimination of vibration problems found in prior-art transport devices, thus, making it possible to improve the transport of printable and/or printed substrates on all of the treatment stations included in a printing machine, in particular, a printing machine without contact with the substrate, such as inkjet printing machines.

Furthermore, according, to a particular embodiment of the present invention, the claimed device and method differ from the prior art due to their flexibility of use and a reduction of the manufacturing time, as well as of related costs, which makes them particularly attractive, particularly for printed electronics, e.g., the manufacture of printed circuits. Thus, the present invention and its claimed suction table, with its described features, here we mention by way of example the structural honeycomb layer, the optional lattice and the absence of baseplates with a multitude of holes, provide very important advantages in the field of printed electronics printing. In fact, the Applicant noted a major improvement in the printing quality and accuracy, as the suction table has a dual beneficial action not only on printing, but also on the drying of the printed ink, which opens up new areas for the present invention, such as printed electronics and, in particular, printed electronics with a radio frequency identification (RFD) tag, with or without a chip (also referred to as RFID tags or RFID tags without a chip); without wishing to be limited by this explanation, the Applicant believes that during the drying of the printed electronics, e.g., during infrared (IR) and/or near-infrared (NIR) treatment, the localized effect of the treatment combined with the effect or heat dissipation through the table allow for better annealing of the ink, which may, e.g., result in improved conductivity. The suction table also makes it possible to better adjust (depending on the substrate and the printing/deposit application) the power and rate of drying. In addition, the suction table allows for heat dissipation, which limits the deformations of certain substrates, i.e., no repercussions among the different treatment stations (e.g., infrared (IR) drying with ultraviolet (UV) drying).

By way of non-limiting illustration, the structural honeycomb layer has a thickness "e" between 1 and 100 mm, between 5 and 30 mm, preferably between 5 and 15 mm, e.g., 8 mm; the size of the chambers (e.g., cells) is between 10 µm and 10 mm, e.g., between 1 and 8 mm, preferably between 2 and 5 mm, e.g., 3.6 mm; the thickness of the chamber walls (e.g., the cells) is between 0.5 µm and 5 mm, e.g., between 10 and 200 microns, preferably between 30 and 100 µm, e.g., 50 µm.

Figure 12:
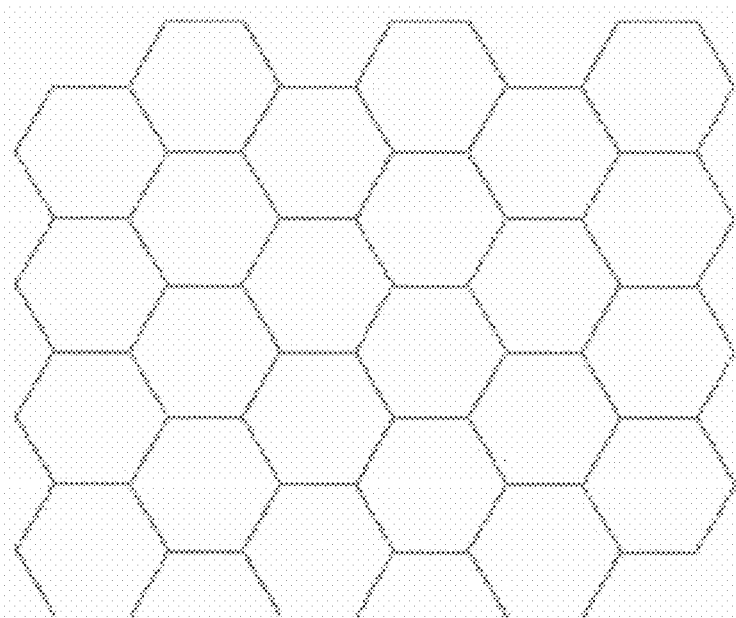

By way of non-limiting illustration, the honeycomb structural layer is a regular hexagonal pattern, as shown in FIG. 12; it therefore consists of hexagonal right prisms (which therefore preferably do not include holes in their vertical walls).

The surface dimensions of the structural honeycomb layer are selected according to the requirements and applications, and preferably correspond to at least the surface of the substrate (or substrates, if more than one is held on the same table); we mention for illustrative purposes the (W/L) dimensions in mm on the order of 760/1070. The widths/lengths of this structural layer of the honeycomb type (e.g., a frame of a rectangular parallelepiped shape of a height corresponding, to the thickness "t." mentioned above) preferably coincides with those of the passive suction layer, and preferably also with those of the active suction layer.

Thus, according to a particular embodiment of the present invention, the table (preferably the suction table) comprises a structural layer of the honeycomb type, as defined above. The use of this structural layer of the honeycomb type in the table (preferably the suction table) has made it possible to solve other basic problems found in the prior-art devices. In fact, inkjet printing techniques (whether via a conventional or special ink printing station (e.g., conductive) and/or a varnish printing station) often require rapid drying of the ink (or varnish), which explains why at least one drying station immediately follows a printing station, along the substrate transport path. This close arrangement is unfortunately not very compatible with the proper functioning of the print heads, as close drying may impact the performance of said heads, e.g., by a blocking effect of the printing-nozzles, as a result of unintentional solidification of the ink in these nozzles. Thus, the prior-art techniques made it necessary either to move the drying station away from the printing station at the risk of harming the print-rendering quality, or strictly control drying, e.g., by decreasing the drying power at the risk of having to drastically restrict the printing rates, as well as harming the print-rendering quality. These problems are even more acute in the field of printed electronics. Thus, the Applicant has discovered that the use of a structural honeycomb layer (as described above) in the table (preferably the suction table) alleviates these prior-art problems, which represents a considerable advantage of the transport device according to the present invention. In fact, without wishing to be limited by this explanation, the Applicant believes that the use of a structural honeycomb layer (as described above) allows for optimal dissipation of the heat generated by the drying station, as well as a drastic reduction of the thermal reflection and transfer phenomena hi the table and/or from the table to the printheads; by way of nonlimiting illustration, the applicant believes that the use of a structural honeycomb layer (as so described above) allows for, e.g., trapping the UV radiation from the drying so that it does not interfere (by way of reflection) with the proper operation of the printheads and thus do not cause hardening of the ink within the print nozzles. In addition, and this constitutes another advantage according to the present invention, the use of a structural honeycomb layer (as described above) makes it possible to dispense with the prior-art suction soles, such as, e.g., those described above (baseplates usually made mainly of metal and/or polytetrafluoroethylene (also known as Teflon) and perforated by a multitude of holes); indeed, the structural layer of the honeycomb type (as described above) may serve directly as a support baseplate fir the substrates and thus allow the table to perform suction and thus holding the said substrates on this baseplate.

In a particular embodiment of the present invention, the structural honeycomb layer is removably attached to the table, which allows it to be replaced and/or changed depending on, for example, the types of substrates used. Any removable fastening system may advantageously be used; by way of illustration, we mention a fastening of the frog-leg and/or clipsable type.

According to an alternative embodiment of the present invention, the structural honeycomb layer is made of aluminum; it is obvious that those skilled in the art will be able to select other materials, whether or not similar to aluminum, which also meet the requirements of the present invention, e.g., steel and/or any plastic material and/or composite and/or suitable ceramic.

According to an alternative embodiment of the present invention, the structural honeycomb layer is not sandwiched, i.e., does not include a lower and/or higher sublayer; this variant is preferred in the case of a suction table in order to not to interfere with the suction through the chambers (e.g., cells).

Lattice

In a particular embodiment of the present invention, the table (preferably the suction table) comprises a structural layer consisting of a lattice for holding the substrates. By way of non-limiting illustration, this lattice may advantageously be used for substrates of low basis weight, which makes it possible to avoid any possible "labeling," of the said substrates during their immobilization on the table. In fact, without wishing to be limited by this explanation, the Applicant believes that the use of a lattice for holding the substrates also makes it possible to freeze and keep the honeycomb layer in its original form while, in the utilization embodiment of the suction table, ensuring and improving suction homogenization.

Figure 13:
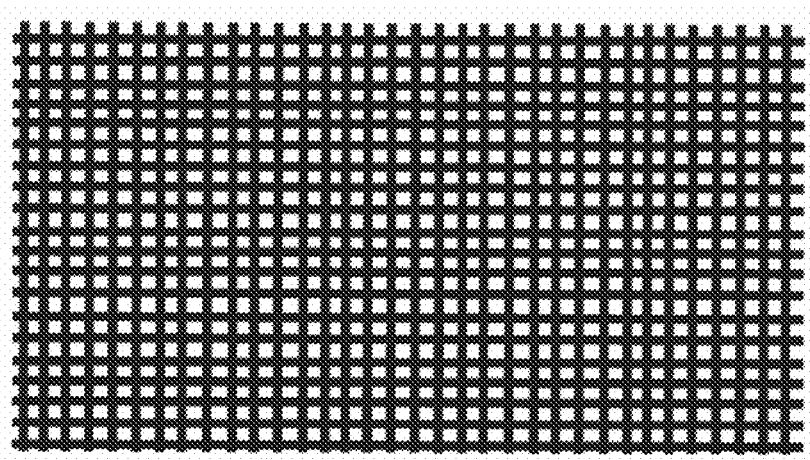

By way of non-limiting illustration, a holding lattice is illustrated in FIG. 13.

By way of non-limiting illustration, a grid of stainless steel and/or ceramic fiber may advantageously be used as a lattice. It is obvious that those skilled in the art will be able to select other materials, whether similar or not to stainless steel and/or ceramic fibers, which also meet the requirements of the present invention.

By way of non-limiting illustration, the lattice mesh is selected from fine meshes in order to avoid texturing of the printed paper.

By way of non-limiting illustration, the dimensions of a lattice mesh will be less than half the size of the honeycomb cell, e.g., less than a quarter of the size of the honeycomb.

By way of non-Limiting illustration, the lattice leas
- A thickness of between 1 μm and 1 mm, preferably between 10 and 500 μm, e.g., between 25 and 300 μm; and/or
- A mesh network (square, triangular rectangle, hexagonal or other), where the greatest length of one side of the mesh is between 1 μm and 1 mm, preferably between 50 and 500 μm, e.g., between 75 and 300 μm; and/or
- A wire diameter of between 1 μm and 1 mm, preferably between 10 and 200 μm, e.g., between 25 and 150 μm.

The surface dimensions of the structural lattice layer will be selected according to the requirements and applications, and will preferably correspond to the surface of the substrate (or substrates, if more than one is held on the same table), plus a safety margin; for illustrative purposes, dimensions (W/L) are stated in mm on the order of 760/1070. The widths/lengths of this lattice will preferably coincide with those of the structural honeycomb layer, and optionally with those of the passive suction layer, and optionally also with those of the active suction layer.

The lattice preferably consists of a network of regular and/or identical meshes.

The combination of a lattice, as defined above, attached to the structural layer of the honeycomb type (as described above) is a preferred embodiment of the present invention for holding the substrates on the table (preferably the suction table). Indeed, the use of a structural layer of the honeycomb type (as described above) and a lattice makes it possible to do without the prior-art suction baseplates, such as, e.g., those described above (baseplates usually made predominantly of metal and/or polytetrafluoroethylene (also known as Teflon) and perforated by a multitude of holes); in fact, the structural layer at the honeycomb type (as described above), upon which a lattice is deposited/attached may serve directly as a support baseplate for the substrates and thus allow the table to perform suction and hold the said substrates on this baseplate.

In a particular embodiment of the present invention, the lattice is removably attached to the table, which allows for its replacement and/or exchange according to, e.g., the types of substrates used. Any removable fastening system may advantageously be used; by way of illustration, we mention a fastening of the frog-leg and/or clip fable type. In an alternative embodiment, the removable fastening system fastens the mesh directly on the honeycomb layer.

According to an alternative embodiment of the present invention, optional masking areas may be added to the lattice, e.g., to prevent aspiration into areas without a substrate.

Filter Layer

In a particular embodiment of the present invention, the table (preferably the suction table) comprises an additional optional layer consisting of a filter, which makes it possible to further improve the efficiency of the table by making it possible to trap the rays, while avoiding their reflection on the table, By way of non-limiting illustration, this filter is an anti-UV filter.

The surface dimensions of the filter layer are selected according to the requirements and applications, and will preferably correspond to the surface of the substrate (or substrates, if more than one is held on the same table), plus a safety margin; by way of illustration, (W/L) dimensions are stated in mm on the order of 760/1070. The widths/lengths of this filter preferably coincide with those of the lattice and/or structural honeycomb layer, and optionally with those of the passive suction layer, and optionally also with those of the active suction layer.

In an alternative embodiment of the present invention, this filter layer is placed directly below and/or above the honeycomb layer and/or the lattice.

Flatness Sublayer

It is possible that height deviations will occur between certain points of the surface of the above-mentioned layers in the table, such that the said deviations create height differences, which m some places may reach an order of magnitude of tens(s), or even hundred(s) of μm's. It is preferable that these deviations be prevented from compromising the quality and/or performance of the treatment stations (especially the printing stations). Moreover, in case of major deviations, there relay be a risk of contact between certain points of the upper layer of the table and the treatment station, e.g., the printheads, which then risk being damaged.

Thus, in a particular embodiment of the present invention, the table (preferably the suction table) comprises additional optional elements (which we will refer to as sub-layer flatness elements) arranged in precise locations between two of the above-mentioned layers, making it possible to improve the homogeneity/flatness of the table supporting the substrate(s).

This additional optional sublayer thus allows for levelling the layers situated above and/or below it, and making the last layer of the table flat.

By way of nonlimiting illustration, this flatness sublayer comprises metal plates of aluminum), which, for illustrative purposes, may be arranged:
- Either between the active suction assembly and the passive suction assembly (chambered structural layer);
- Or between the passive suction assembly (chambered structural layer) and the honeycomb layer.

Carriage Structure, Etc.

FIG. 7 thus illustrates a variant of the carriage according to the resent invention, said carriage comprising a structural base shown in light gray and surmounted by a table (in dark gray) for supporting the substrates, V-shaped wheels below the base (for the fixed V-guide rail) and slide pads; this FIG. 7 also schematically illustrates a conductive contact element (sliding electrical contact), which ensures the electrical connection between the conductor rail (described below and the carriage.

In summary, and not necessarily illustrated in the figures, the carriage according to the present invention advantageously comprises the following:
- A structural frame, preferably of aluminum, said frame being able to act as a base for the carriage; and/or
- An element of the guide system, e.g., an element of the V-guide system (e.g., the V-shaped wheels); and/or
- An element of the slide(s), e.g., the sliding element (e.g., the pad(s)); and/or
- A control element for the carriage, e.g., a programmable controller; and/or
- A drive system for orienting the table in the three dimensions of space; and/or
- A holding table; and/or
- A suction table; and/or
- An active suction assembly; and/or
- A passive suction assembly; and/or
- A honeycomb layer; and/or
- A lattice; and/or
- A filter layer; and/or
- A flatness sublayer; and/or
- Displacement sensor elements; and/or
- Carriage protection elements, as described below.

In a particular embodiment of the present invention, the carriage also includes a substrate-lifting device. Indeed, in certain situations and, in particular in the field of printed electronics printing, it is necessary to use a particular system for feeding and removing the substrates to be treated, the said system making it necessary to incorporate in the carriage an autonomous device for lifting the substrates. Any autonomous lifting device may advantageously be used; for illustrative purposes, we mention a device comprising jacks arranged on the carriage, e.g., arranged in the table. Thus, this device makes it possible
- To receive the substrates to be treated at a sufficient elevation above the table, while supplying the substrate to be treated; and
- To position the said ted substrates at a sufficient elevation above the table, the elevation being dictated by the particular substrate feeding and removal system, Carriage Protection In a particular embodiment of the present invention, the carriage structure comprises at least one protection, which makes it possible to avoid damaging the other components of the carriage in the event of an accidental collision between two carriages. This protection will therefore ideally be placed on the front or rear edge (seen in the direction of travel) of the carriage or, preferably, on the front and rear edges of the carriage. As the device according to the present invention makes it possible to control each of the carriages individually and thus precisely know their positions and speeds, these protections are not required. However, in order to mitigate the potential risks related, e.g., to a power failure and/or a failure related to data transmission (instructions) to the carriage, this type of protection is given preference. Any protection to minimize and/or eliminate problems that could have an impact on the carriages may advantageously be used in the context of the present invention; by way of non-limiting illustration, we mention impact protection of the shock-absorption type, either using springs or through defamation.

Siding—Bypass

An optional feature of the substrate-transport device of the present invention is thus the use of a carousel-type substrate conveyor for guiding and moving the substrates through the treatment stations, the said conveyor comprising carriages, which hold the substrates in a stationary (e.g., flat) position and which move on a fixed rail, which forms a transport loop, characterized in that the device comprises a siding for the carriages, the said siding being releasably connected to the conveyor rail and thus allowing for adding and/or removing one or more carriages. By way of non-limiting illustration, this type of siding is similar to what is used in the rail sector, a switch to divert certain trains and/or freight cars. By way of non-limiting illustration, the carriage may be conveyed by perpendicular translation to the transport loop toward the said siding by means of any other appropriate device. This siding may advantageously from a dead end and/or a bypass loop on the transport loop, and be located at any suitable location of the transport loop, with an identical and or different entry and exit point of the loop.

Moreover, this siding is very useful, as it allows any maintenance action on the carriages; we mention by way of non-limiting illustration;
- The maintenance and/or replacement of one or more table components, as described above. e.g., the protection and/or the lattice and/or the honeycomb layer and/or an active suction element (e.g., a fan);
- Maintenance and/or replacement of one or more components of the active part (or the passive part, depending on the configuration) of the linear drive;
- Maintenance and/or replacement of one or more components of the displacement sensors;
- The addition and/or removal of carriage(s) in the transport.

Thus, an optional feature of the substrate-transport device of the present: invention is the use of a carousel-type substrate conveyor for guiding and moving the substrates through the treatment stations, said conveyor comprising carriages, which hold the substrates in a stationary (e.g., flat) position and which move on a fixed rail, which forms a transport loop, characterized in that the device comprises a bypass path for the carriages, the said path being removably connected to the conveyor mil and thus making it possible to provide any type of additional treatment of the substrate. By way of non-limiting illustration, we mention a process of reversing the substrate on the table and/or a coating station, often referred to as a gilding station ("foil"), as described above in the specification; however, it should be noted that these treatments and/or processes could also take place in the main transport loop. This bypass route may advantageously form a bypass loop in the transport loop, and be situated at any suitable location of the transport loop, with an identical and/or advantageously different point of entry and exit in the loop; e.g., fora substrate reversal process, a bypass loop may advantageously be arranged between the substrate loading and unloading stations.

Maintenance Tray

In a particular embodiment of the present invention, the substrate-transport device comprises at least one carriage provided with a maintenance tray (e.g., a cleaning tray and/or an adjustment tray). This maintenance carriage (e.g., "cleaning" and/or "adjustment" carriage) may advantageously be in idle mode on a siding, as defined above, and subsequently brought into active mode in the transport loop in order to perform any maintenance action required for the proper operation of the treatment stations. This cleaning and/or adjustment carriage is very useful, as it allows for performing, any maintenance action on the treatment stations; we mention for illustrative and non-limiting purposes:
- The maintenance and/or replacement of one or more components of the treatment stations, e.g., cleaning of the printing nozzles, etc.

Any adjustment action of the treatment station components.

Diagnostic Tray

In a particular embodiment of the present invention, the substrate-transport device comprises at least one carriage equipped with a diagnostic tray. This diagnostic carriage may advantageously be in idle mode on a siding, as defined above, and subsequently placed in active mode on the transport loop in order to perform any diagnostic action in order to verify the proper operation of the treatment stations.

By way of non-limiting illustration, we mention an analysis of the printheads.

In an alternative embodiment of the present invention, a carriage may comprise both a diagnostic tray and a maintenance tray.

Data & Energy—Equipment & Management

A feature of the present invention is therefore the use of a substrate conveyor (preferably of the carousel type) for guiding and moving, the substrates through the treatment stations, the said conveyor comprising carriages, which hold the substrates in at stationary (e.g., flat) position, and which move on a fixed rail, which makes it possible to move each carriage/substrate on the rail.

The part of the claimed device (with the exception of the carriage) allowing for supervision and/or control of the different elements of the said machine represents the "management component of the printing machine." By way of non-limiting illustration, the management component of the printing machine may comprise the communication portion for exchanging information between the different elements of the machine and/or with the carriages. By way of non-limiting illustration, this information consists of commands, instructions, positions, speeds, ID's or any other useful information to be exchanged between the different elements of the machine and/or the carriages. The management component of the printing machine may contain the command means for different actuators, such as the control means for the treatment stations. The management component may also involve the management of different sensors (e.g., a sensor arranged on the transport loop and/or in the treatment suctions, e.g., positioning sensor(s)). The Management component may include management of the effectors. An effector finalizes the work; it produces the expected effect. The management component may also contain interfaces, such as indicator lights, a screen, a means of identification, and any other interfacing means. Indeed, the Applicant does not wish to be limited to human-machine interfaces. It is quite conceivable to have a machine-machine interface. By way of non-limiting illustration, a machine-machine interface may be an element of a treatment station (such as a barcode) allowing the carriages to identify the treatment station and act accordingly. Of course, the Applicant does not wish to be limited solely to the elements mentioned above. It is obvious to those skilled in the art that programmable controllers, electronic circuits (which may contain FPGAs [Field Programmable Gate Arrays], and/or microprocessors), etc., may be included in the management component of the printing machine.

In a preferred embodiment of the present invention, the substrate-transport carriage may therefore travel autonomously along the transport loop by means of an active motor element ensuring its displacement, e.g., the linear motor described above (intelligent and/or autonomous carriage). This embodiment involves the need to supply the mobile carriage with energy and ensure the transfer of information, preferably the bidirectional transfer of information (digital information preferences). In a preferred embodiment of the present invention, this power supply will be permanent; however, standby periods will be tolerated, when the carriage is located in an area, where it can remain stationary and/or without the need for information transfer.

The "carriage management component" represents the part of the carriage that supervises and/or controls the different elements of the carriage. As a non-limiting illustration, the management portion of the carriage may include the communication portion for exchanging information with the rest of the machine. By way of non-limiting illustration, this information are commands, instructions, positions, speeds, ID's or any other useful information to be exchanged between the carriage and the rest of the machine. The carriage management component may contain the control means for different actuators, such as control means for the primary motor assembly. The management component may also involve the management of different sensors (e.g., a sensor contained in the carriage, such as positioning sensor(s)). The management component may include effector management. An effector finalizes the work; it produces the expected effect. The management component may also contain interfaces such as indicator lights, a screen, a means of identification, and any other interfacing means. In fact, the Applicant does not wish to be limited to human-machine interfaces. It is quite conceivable to have a machine-machine interface. By way of non-limiting illustration, it machine-machine interface may be a carriage element (such as a barcode) allowing other treatment stations to identify this carriage and act accordingly. The carriage management component may be considered a part of the carriage rendering the carriage intelligent and/or autonomous. Naturally, the Applicant does not wish to be limited solely to the elements mentioned above. It is obvious to those skilled in the art that programmable logic controllers electronic circuits (which may contain FPGAs, and/or microprocessors), etc . . . , may be included in the management component of the carriage. By way of non-limiting illustration, the management component may also include energy regulation means.

Any energy supply solution for the mobile carriage may advantageously be used in the context of the present invention. In a preferred embodiment of the present invention, the power supply of the (intelligent and/or autonomous) mobile carriage will be sufficient to provide electricity to The primary motor assembly of the linear drive of the carriage; and optionally The carriage management component; and/or The suction table; and/or The displacement detection system (or sensor) on the carriage.

The following are purely illustrative and not limiting power supplies for the battery, cell, solar panel, power generator (e.g., via gasoline), mechanical movement (e.g., via a weight-winding mechanism), automatic movement, and dynamo type, etc . . . in a preferred embodiment according to the present invention, the power supply of the mobile carriage comprises a set of electrically conductive rails, which are preferably fastened along the transport path and a sliding contact element, which is preferably movable and fastened on the carriage. By way of non-limiting illustration, FIGS. 1 and 6 show the said conductive rails; along the transport loop in FIG. 1 and on the left part in FIG. 6, as already described above. FIG. 6 shows how the power supply system is fastened on the baseplate; in FIG. 1, it is fastened over the whole length of the baseplate and subsequently on the supporting structure of the (lightened/recessed) transport device according to the present invention.

By way of non-limiting illustration, FIG. 7 shows on the left, a type of comb corresponding to a simplified representation of the sliding contact element for supplying energy to the carriage.

Any solution for transferring information from/to the mobile carriage may advantageously be used in the context of the present invention. In a preferred embodiment of the present invention, a radiating cable system is used. For non-limiting and illustrative purposes, FIG. 6 shows the radiating cable to the left on the figure; in this illustration, it is placed above the conductor rails.

Conductor Rails

In an alternative embodiment of the present invention, the set of conducting rails (e.g., of the "third-rail" type) ensures (possibly bidirectional) transmission:

1. of (Electrical) energy supplying the active motor element for the carriage and computer control means for the transport device; and/or
2. of electrical safety signals (global emergency stop and individual error signals for each mobile carriage) ensuring that the whole mobile carriages come to a stop in the event of a fault, e.g., in the event of a fault of one or more carriages and/or in case of a defect in other elements of the transport device and/or the printing machine; and/or
3. of electrical signals allowing the precise synchronization of the mobile carriages with each other and/or a centralized computer control means.

For illustrative purposes, this precise synchronization may be obtained by using:

A centralized clock; and/or
Centralized cycle start/stop signals.

By way of illustration, this precise synchronization not only allows for optimizing the movement cycle times of the carriages and thus the treatment of the substrates; but also, in certain particular embodiments of the present invention, for organizing simultaneous stops of two carriages for loading and unloading their substrate(s).

Sliding Contacts

In a preferred embodiment of the present invention, the power supply of the mobile carriage thus comprises at least one sliding contact element fastened on the carriage, the said contact sliding on the set of conductive rails described above. By way of non-limiting illustration, FIG. 7 shows to the left on the figure, a type of comb corresponding to a simplified representation of the sliding contact element for supplying the carriage with energy, said contact befog fastened on the carriage structure. In a preferred embodiment of the present invention, each mobile carriage is equipped with several sliding contacts on the set of conductive rails, said sliding contacts forming an assembly fastened on each carriage.

Each carriage is thus continuously supplied and synchronized throughout the transport carousel, without having to be connected by means of cables to a centralized power supply system, something which represents a considerable advantage of the power supply system of the transport device according to the present invention.

Wireless Communication

Thus, in a preferred embodiment of the present invention, the substrate transport carriage may therefore move autonomously along the transport loop, which makes it necessary to ensure the transfer of information to the carriage, preferably the bidirectional transfer of information to from the carriage (preferably digital information).

As already indicated, any solution related to the transfer, preferably bi-directional transfer, of contactless information to/from the mobile carriage may advantageously be used in the context of the present invention, such as, e.g., a system for radio transmission of information, as shown in FIG. 6, in particular, a radiating cable.

In a preferred embodiment of the present invention, the information supply for the mobile carriage is done contactlessly, e.g., by using the aforementioned radiating cable.

In a preferred embodiment of the present invention, the Applicant developed a contactless communication system for the transfer, preferably bidirectional transfer, of information to/from the carriage. By way of illustration, we mention the option of radio waves, whose transmission is ensured by technology selected from A radiating cable; and/or
A waveguide; and/or
Antennas.

In a preferred embodiment of the present invention, the preferred contactless communication solution for transferring information to and/or from the mobile carriage comprises a fixed radiating cable along the transport loop for the transmission of radio waves in communication with at least one radio-wave-receiving antenna placed on each of the carriages.

This type of contactless communication allows, by way of illustration, for configuration of the carriage motion cycle, the said configuration being acquired from a computer control means.

By way of illustration, the means of communication selected for customization is a wireless communication via an electromagnetic radiating cable placed along the whole carousel.

Any wireless information transmission technology between the mobile carriage and the fixed part of the device according to the present invention may advantageously be used, By way of illustration, we mention LTE and/or LTE-advanced technology (standards derived from current (3G/4G) and future generations of mobile telephony), and/or WiMAX technology (acronym for Worldwide Interoperability for Microwave Access), and/or or Wi-Fi technology (abbreviation for Wireless Fidelity), and/or femtocell technology, and/or Bluetooth wireless technology, and/or DECT (acronym for Digital Enhanced Cordless Telecommunication).

In an alternative embodiment of the present invention, the transmission of the wireless information between the mobile carriage and the fixed part of the device according to the present invention may advantageously be carried out by means of the Li-Fi ("light fidelity") technology, using the principle of transmission of information by light, e.g., by modulating the light transmission very rapidly; any type of adapted current or future lamps may advantageously be used (e.g., LED lamps).

In an alternative embodiment of the present invention, the transfer of wireless information between the mobile carriage and the fixed part of the device according to the present invention may also be done by means of laser technology.

In an alternative embodiment of the present invention, the (bidirectional) transfer technology for the contactless information between the mobile carriage and the fixed part of the transport device (e.g., the radiating cable) will be based on a so-called "short-distance" solution in order to avoid the risk of interference with the immediate environment for the transport device; for illustrative and non-limiting purposes, we mention Near Field Communication ("NFC") technology.

In a preferred embodiment of the present invention, the preferred contactless communication solution for transferring information from the transport loop to the carriages comprises an information transmission means, i.e., a fixed element along the transport loop (e.g., a radiating cable) and, on each mobile carriage, a means for receiving said information, i.e., a movable element fastened on each of the carriages (e.g., an antenna), an element preferably coupled electromagnetically to the above-mentioned fixed element along the loop (preferably a radiating cable). This solution is of interest, in that:

It has a limited radiating field near the cable and thus generates few electromagnetic interferences; and/or It is immune to electromagnetic interferences, which may be generated by the external environment and/or the mobile carriage itself due to the possible use of an electromagnetic displacement means (a linear motor, etc.).

In a preferred embodiment of the present invention, the information communication is bidirectional. In this embodiment, the preferred bidirectional communication solution comprises a means for information transmission and reception, i.e., a fixed element along the transport loop a radiating cable) and, on each mobile carriage, a means for receiving and transmitting information (e.g., an antenna), an element preferably coupled electro-magnetically to the above-mentioned fixed element along the loop (preferably a radiating cable). This solution has the advantage, in addition to customization, to allow for information feedback from each of the mobile carriages to the "control-means" software of the claimed device, e.g., information relating to the movements of the carriage (speed, position, acceleration, deceleration) and/or relating to various and sundry statuses (e.g., error messages, information from sensors, etc.). The preferably bidirectional transmission of information between, the control means (e.g., a computer) and the means for transmitting and receiving information from the claimed device (e.g., the fixed element along the transport loop, preferably the radiating cable) may be wired and or contactless, using any of the aforementioned contactless technologies.

Carriage Detection Sensor

In a preferred embodiment of the present invention, the claimed device furthermore comprises a set of sensors and protections ensuring the displacement safety of the mobile carriages, e.g., distance sensors. By way of illustration, we mention the presence on the carriages of a distance sensor for detecting the carriage, which precedes it along the transport path and/or a distance sensor for detecting the carriage, which follows it along the transport path; thus, each carriage may manage in an autonomous fashion its position relative to the other carriages and adapt its position, and/or its speed, and/or its deceleration and/or its acceleration.

Any type of position-detection sensor may advantageously be used in the context of the present invention; by way of non-limiting illustration, laser sensors will be preferred. The use of the said sensors will allow each carriage:

To be independent and thus ensure its autonomy;

To avoid collision with the carriages situated ahead and/or behind, and thus ensure compliance with operations (acceleration, continuous speeds, etc.)

In an alternative embodiment of the present invention, each carriage comprises at least one detection sensor, as described above, the said sensor being positioned at any suitable location on the front and/or rear edge of the carriage (in the sliding direction of the carriage), e.g., at the center of the edge.

In a particular embodiment of the present invention, each carriage comprises at least one detection sensor, as described above, said sensor being positioned on the front and/or rear edge of the carriage (in the sliding direction of the carriage), and characterized in that its position on the edge of the carriage is located proximate to and/or at the external corner of the edge (the term "external" is used in relation to the rotation around the loop); e.g., for a carriage whose (front or rear) edge is of a length X, the sensor will be arranged on the (front or rear) edge, at a distance from the outer corner below X/2, below X/4, of preferably below X/8.

In a preferred embodiment of the present invention, each carriage comprises at least one detection sensor, as described above, on the font edge of the carriage, and at least one detection sensor, as described above, on the rear edge of the carriage.

In an alternative, embodiment of the present invention, the wave emitted by the sensor positioned at the front rear edge of a carriage forms any appropriate angle relative to the said front/rear edge of the carriage, e.g., a 90-degree angle.

In a particular embodiment of the present invention, the wave emitted by the sensor positioned at the front/rear edge of a carriage forms an angle relative to the said front/rear edge of the carriage between 30 and 90 degrees, e.g., less than 90 degrees, between 35 and 55 degrees, e.g., between 40 and 50 degrees, e.g., on the order of 45 degrees.

Furthermore the present invention relates to the use of the device and/or the method of transporting substrates according to any of the above-described embodiments in a printing machine, comprising at least two different in-series, contactless printing stations (preferably digital inkjet printing), and at least one drying station along the transport path; and, in particular, the said use in a printing machine furthermore comprises a coating station (e.g., by applying an additional coating, e.g., gilding or other material) applying/pressing a sheet of the said coating onto selected areas of the substrate (e.g., comprising an adhesive deposit in a predetermined pattern), in order for the desired portion of the sheet of the said coating to adhere to selected areas.

The present application describes various technical features and advantages with reference to the figures and/or various embodiments, Those skilled in the art will understand that the technical features of a given embodiment may in fact be combined with the features of another embodiment, unless the contrary is explicitly stated, or it is evident. that these features are incompatible. What's more, the technical features described in a given embodiment may be isolated from the other features of this embodiment, unless the contrary is explicitly stated.

It should be obvious to those skilled in the art that the present invention allows for embodiments in many other specific forms, without departing from the scope of the invention, as claimed. Therefore, the present embodiments should be considered to be by way of illustration, but may be modified in the field defined by the scope of the appended claims, and the invention should not be limited to the details given above.

The invention claimed is:

1. A device for transporting substrates in a printing machine comprising one or more treatment stations, including at least one printing station, along a transport path from at least one input area supplying the printable and/or printed substrates up to at least one output area receiving the treated substrates, comprising a substrate conveyor for guiding and moving the substrates through the treatment stations, the conveyor comprising at least one carriage, which holds the substrates in a stationary position and which transports the substrates along the transport path; and wherein:
1. The substrate-transport device comprises a drive system for moving the carriage along the transport path;
2. The substrate-transport device being equipped with at least one displacement detection system for detecting displacement to measure a displacement of the carriage relative to the transport path and at least one other displacement detection system for measuring a displacement of the carriage relative to one of the treatment stations; and
3. the carriage comprises a table for holding the substrate in a stationary position relative to the table along the transport path during the treatment(s) of the substrate;

wherein the displacement detection system for measuring the displacement of the carriage relative to the transport path comprises at least one displacement sensor "O" comprising a movable part and a fixed part, and the displacement detection system for measuring the displacement of the carriage relative to the treatment station(s) comprises a displacement sensor "M" comprising a movable part and a fixed part, the fixed part of the displacement sensor "O" is a ruler positioned along the transport path, the movable part of the displacement sensor "O" is a reader integrated into the carriage, the movable part of the displacement sensor "M" is a ruler fixed to the carriage, and the fixed part of the displacement sensor "M" is a reader integrated in the treatment station(s).

2. The device for transporting substrates according to claim 1, wherein the reader integrated into the carriage of the movable part of the displacement sensor "O" is an optical reader.

3. The device for transporting substrates according to claim 1, wherein the ruler of the displacement sensor "O" is linear.

4. The device for transporting substrates according to claim 1, wherein the ruler of the displacement sensor "O" is optical.

5. The device for transporting substrates according to claim 1, wherein the ruler of the displacement sensor "O" is positioned along a transport loop under one or more of the treatment stations.

6. The device for transporting substrates according to claim 1, wherein the movable part of the displacement sensor "M" is a ruler fixed to the carriage along a longitudinal axis parallel to a direction of movement of the carriage.

7. The device for transporting substrates according to claim 1, wherein the reader integrated into the treatment station(s) of the fixed part of the displacement sensor "M" is a magnetic reader.

8. The device for transporting substrates according to claim 1, wherein the ruler of the displacement sensor "M" is linear.

9. The device for transporting substrates according to claim 1, wherein the ruler of the displacement sensor "M" is magnetic.

10. The device for transporting substrates according to claim 1, wherein the substrate holding table is a suction table comprising an active suction assembly in combination with a passive suction assembly which includes a structural honeycomb layer.

11. The device for transporting substrates according to claim 1, wherein the transport path is a transport loop, the conveyor comprises a fixed rail which forms the transport loop, and the at least one carriage that maintains the substrates in a stationary position moves on the rail transporting the substrates, the substrate transport device being adapted to move each carriage on the rail along the transport loop; wherein:
1. The substrate transport device comprises a base on which at least a part of the rail is fixed and a surface of which is flat; and
2. the substrate transport device comprises the drive system which allows movement of the at least one carriage on the fixed rail.

12. The device for transporting substrates according to claim 11, wherein the drive system is a linear motorization based on an electromagnetic interaction between a primary assembly of coils and a secondary assembly comprising a path of permanent magnets, and the primary assembly of the linear motorization is part of the at least one carriage and the secondary assembly comprising the path of permanent magnets is fixed along the transport path.

13. The device for transporting substrates according to claim 12, wherein the secondary assembly is positioned in at least one manner selected from the group consisting of: on the fixed rail, forming an integral part of the fixed rail, being fixed to the base, forming an integral part of the base, being fixed to a rigid structure for retaining the rail, and forming an integral part of the rigid structure.

14. The device for transporting substrates according to claim 11, wherein the base consists of at least one material selected from the group consisting of: marble, granite, and cast iron.

15. The device for transporting substrates according to claim 11, wherein the system for guiding the carriage on the fixed rail comprises at least one pair of guide elements arranged on either side of the rail, each pair of guide elements comprising a mechanism ensuring guidance of the carriage both in straight lines and in bends.

16. The device for transporting substrates according to claim 15, wherein the mechanism ensuring guidance of the carriage comprises a retaining bar which connects the at least one pair of guide elements, the retaining bar comprising a pivoting axis connected to the carriage making it possible to ensure optimal guidance of the carriage along the rail and along bends formed by the transport loop.

17. The device for transporting substrates according to claim 15, wherein the guide system is a V-shaped guide system.

18. The device for transporting substrates according to claim 11, further comprising at least one slide consisting of a rail and a guide element fixed to the carriage, and the slide rail is positioned in at least one manner selected from the group consisting of: an integral part of the fixed rail, fixed on the fixed rail, fixed on the base of the fixed rail, an integral part of the base of the fixed rail, fixed on the supporting structure of the fixed rail, and an integral part of the supporting structure of the fixed rail; and wherein a total length of the slide rail is selected to cover an entire space below the transport loop print stations.

19. The device for transporting substrates according to claim 18, wherein a width of an initial end and/or a width of a final end of the slide rail is less than an average width of the slide rail, and wherein the initial end is at an input area in a direction of movement of the carriage and the final end is at an output area in the direction of movement of the carriage.

20. The device for transporting substrates according to claim 1, further comprising a device for supplying energy to the at least one carriage, the energy supplying device comprising a set of electrically conductive rails along the transport path and a sliding contact element fixed on the carriage.

21. The device for transporting substrates according to claim 1, further comprising a device for transferring information to and from the at least one carriage, the information transferring device comprising a cable system radiating along the transport path.

22. Use of the device for transporting substrates according to claim 1 in a printing machine comprising at least two different in-series, contactless printing stations and at least one drying station along the transport path.

23. Use of the device for transporting substrates according to claim 22 in a printing machine also comprising a coating station by applying/pressing a sheet of the coating onto selected areas of the substrate, such that the desired portion of the sheet of said coating adheres to the selected areas.

24. Use of the device for transporting substrates according to claim 1 for printed electronics, preferably for printed electronics for a radio frequency identification tag, with or without a chip.

25. A method of transporting substrates in a substrate-transport device according to claim 1, in a printing machine comprising one or more treatment stations, including at least one printing station, along a transport path from at least one input area supplying the printable substrates, to at least one output area receiving the treated substrates, said method comprising the following steps:

optionally positioning a printable substrate in the input area prior to guiding and moving the substrates through the one or more treatment stations; and guiding and moving at least one of the substrates through the one or more treatment stations using a substrate conveyor, said conveyor comprising at least one carriage which maintains the substrates in a stationary position and which moves along the transport path transporting the substrates;

wherein:
1. The substrate-transport device comprises a motorization system which allows movement of the carriages along the transport path;
2. The substrate-transport device is equipped with at least one displacement system to measure a displacement of the carriage relative to the transport path, and at least one other displacement detection system to measure a displacement of the carriage relative to the treatment station(s); and
3. the carriage includes a table on which the substrate is held in a stationary position relative to the table along the transport path during treatment of the substrate;
4. The displacement detection system for measuring the displacement of the carriage relative to the transport path comprises at least one displacement sensor "O" comprising a movable part and a fixed part, and the displacement detection system for measuring the displacement of the carriage relative to the treatment station(s) comprises a displacement sensor "M" comprising a movable part and a fixed part; the fixed part of the displacement sensor "O" is a ruler positioned along the transport path, the movable part of the displacement sensor "O" is a reader integrated into the carriage, the movable part of the displacement sensor "M" is a ruler fixed to the carriage, and the fixed part of the displacement sensor "M" is a reader integrated in the treatment station(s).

* * * * *